US009665702B2

(12) United States Patent
King et al.

(10) Patent No.: US 9,665,702 B2
(45) Date of Patent: *May 30, 2017

(54) RESTRICTED EXECUTION MODES

(71) Applicant: Microsoft Technology Licensing, LLC, Redmond, WA (US)

(72) Inventors: Joseph Spencer King, Seattle, WA (US); Michael Burt Goulding, Redmond, WA (US); Todd Myles Derksen, Redmond, WA (US); Aaron Naoyoshi Sheung Yan Woo, Bellevue, WA (US); Bernardo Iturriaga Dubost, Kirkland, WA (US); Alan Bennett Auerbach, Sammamish, WA (US); David A. Braun, Redmond, WA (US); Andrew P. Begun, Redmond, WA (US); Andrew Craig Haon, Seattle, WA (US); Joseph H. Matthews, III, Woodinville, WA (US); Jennifer Anne Karr, Edmonds, WA (US); Joseph A. Schrader, Kirkland, WA (US); Ted Tai-Yu Chen, Seattle, WA (US); Raman K. Sarin, Redmond, WA (US); Sharad Agarwal, Seattle, WA (US); Shai Guday, Redmond, WA (US); Shawn M. Thomas, Redmond, WA (US); John D. Skovron, Bellevue, WA (US); John A. Yovin, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,300

(22) Filed: Apr. 14, 2015

(65) Prior Publication Data

US 2015/0220712 A1 Aug. 6, 2015

Related U.S. Application Data

(63) Continuation of application No. 13/726,099, filed on Dec. 22, 2012.
(Continued)

(51) Int. Cl.
*G06F 21/31* (2013.01)
*H04W 4/00* (2009.01)
(Continued)

(52) U.S. Cl.
CPC .............. *G06F 21/31* (2013.01); *G06F 21/53* (2013.01); *G06F 21/629* (2013.01);
(Continued)

(58) Field of Classification Search
CPC ...................................................... G06F 21/31
See application file for complete search history.

(56) References Cited

U.S. PATENT DOCUMENTS 5,883,598 A 3/1999 Parl et al.
6,286,001 B1 9/2001 Walker et al.
(Continued)

FOREIGN PATENT DOCUMENTS

CN 1984402 6/2007
CN 101112072 1/2008
(Continued)

OTHER PUBLICATIONS

"iOS 5", "https://en.wikipedia.org/wiki/IOS_5" release date Oct. 12, 2011.*
(Continued)

*Primary Examiner* — Saleh Najjar
*Assistant Examiner* — Simon Kanaan

(57) ABSTRACT

In embodiments of restricted execution modes, a mobile device can display a device lock screen on an integrated display device, and transition from the device lock screen to display a shared space user interface of a shared space. The transition to display the shared space user interface is without receiving a PIN code entered on the device lock screen. The mobile device implements a restricted execution service that is implemented to activate a restricted execution mode of the mobile device, and restrict access of a device application to device content while the restricted execution mode is activated. The restricted execution service can also allow a shared device application that is included in the shared space access to the device content while the restricted execution mode is activated.

20 Claims, 10 Drawing Sheets

Related U.S. Application Data

(60) Provisional application No. 61/580,147, filed on Dec. 23, 2011, provisional application No. 61/695,294, filed on Aug. 30, 2012.

(51) Int. Cl.
   *H04W 12/10* (2009.01)
   *G06F 21/62* (2013.01)
   *G06F 21/53* (2013.01)
   *H04W 12/08* (2009.01)
   *H04W 88/02* (2009.01)

(52) U.S. Cl.
   CPC ........... *H04W 4/003* (2013.01); *H04W 12/08* (2013.01); *H04W 12/10* (2013.01); *G06F 2221/2129* (2013.01); *G06F 2221/2149* (2013.01); *H04W 88/02* (2013.01)

(56) References Cited

U.S. PATENT DOCUMENTS

| | | | |
|---|---|---|---|
| 6,339,826 | B2 | 1/2002 | Hayes et al. |
| 6,405,033 | B1 | 6/2002 | Kennedy et al. |
| 6,446,069 | B1 | 9/2002 | Yaung et al. |
| 6,504,480 | B1 | 1/2003 | Magnuson et al. |
| 6,519,530 | B2 | 2/2003 | Crockett et al. |
| 6,546,002 | B1 | 4/2003 | Kim |
| 6,549,768 | B1 | 4/2003 | Fraccaroli |
| 6,564,149 | B2 | 5/2003 | Lai |
| 6,650,189 | B1 | 11/2003 | Romao |
| 6,662,023 | B1 | 12/2003 | Helle |
| 6,678,508 | B1 | 1/2004 | Koilpillai et al. |
| 6,799,047 | B1 | 9/2004 | Bahl et al. |
| 6,847,892 | B2 | 1/2005 | Zhou |
| 6,920,455 | B1 | 7/2005 | Weschler |
| 6,941,134 | B2 | 9/2005 | White |
| 6,990,353 | B2 | 1/2006 | Florkey et al. |
| 7,058,659 | B2 | 6/2006 | Ryu |
| 7,076,797 | B2 | 7/2006 | Loveland |
| 7,096,030 | B2 | 8/2006 | Huomo |
| 7,142,848 | B2 | 11/2006 | Owen et al. |
| 7,161,914 | B2 | 1/2007 | Shoaib et al. |
| 7,171,557 | B2 | 1/2007 | Kallahalla et al. |
| 7,212,613 | B2 | 5/2007 | Kim et al. |
| 7,222,360 | B1 | 5/2007 | Miller |
| 7,272,388 | B2 | 9/2007 | Andrew et al. |
| 7,274,925 | B2 | 9/2007 | Chaar et al. |
| 7,302,272 | B2 | 11/2007 | Ackley |
| 7,305,284 | B2 | 12/2007 | Teshima et al. |
| 7,308,255 | B2 | 12/2007 | Loveland |
| 7,321,774 | B1 | 1/2008 | Lau et al. |
| 7,346,921 | B2 | 3/2008 | Murren et al. |
| 7,353,234 | B2 | 4/2008 | Kimball et al. |
| 7,359,713 | B1 | 4/2008 | Tiwari |
| 7,366,798 | B2 | 4/2008 | Nordstrom et al. |
| 7,397,908 | B2 | 7/2008 | Janssen |
| 7,408,506 | B2 | 8/2008 | Miller |
| 7,471,929 | B2 | 12/2008 | Fujioka et al. |
| 7,530,099 | B2 | 5/2009 | Flurry et al. |
| 7,629,891 | B1 | 12/2009 | Bell |
| 7,634,455 | B1 | 12/2009 | Keene et al. |
| 7,657,849 | B2 | 2/2010 | Chaudhri et al. |
| 7,668,830 | B2 | 2/2010 | Hakala |
| 7,680,882 | B2 | 3/2010 | Tiu, Jr. et al. |
| 7,714,778 | B2 | 5/2010 | Dupray |
| 7,796,944 | B2 | 9/2010 | Eaton et al. |
| 7,809,350 | B2 | 10/2010 | Buckley et al. |
| 7,869,792 | B1 | 1/2011 | Zhou et al. |
| 7,898,428 | B2 | 3/2011 | Dietz et al. |
| 7,958,562 | B2 | 6/2011 | Gaucas |
| 7,961,651 | B2 | 6/2011 | Kim et al. |
| 8,046,839 | B2 | 10/2011 | Lo |
| 8,244,272 | B2 | 8/2012 | Morgan et al. |
| 8,275,352 | B2 | 9/2012 | Forstall et al. |
| 8,311,730 | B2 | 11/2012 | Neff |
| 8,331,899 | B2 | 12/2012 | Broms |
| 8,355,751 | B2 | 1/2013 | Dietz et al. |
| 8,385,039 | B2 | 2/2013 | Rothkopf |
| 8,437,779 | B2 | 5/2013 | Phukan |
| 8,477,139 | B2 * | 7/2013 | Robinet .............. G06F 3/04815 345/419 |
| 8,549,657 | B2 | 10/2013 | Karlson et al. |
| 8,565,820 | B2 | 10/2013 | Riemer et al. |
| 8,657,743 | B2 | 2/2014 | Rietzel et al. |
| 8,660,531 | B2 | 2/2014 | Hymel |
| 8,706,172 | B2 | 4/2014 | Priyantha et al. |
| 8,874,162 | B2 | 10/2014 | Schrader et al. |
| 8,907,772 | B1 | 12/2014 | Green et al. |
| 8,918,119 | B2 | 12/2014 | Kim et al. |
| 9,027,117 | B2 | 5/2015 | Wilairat et al. |
| 9,066,234 | B2 | 6/2015 | Karlson et al. |
| 9,230,076 | B2 | 1/2016 | King et al. |
| 9,363,250 | B2 | 6/2016 | Matthews et al. |
| 9,420,432 | B2 | 8/2016 | Matthews et al. |
| 9,467,834 | B2 | 10/2016 | Guday et al. |
| 9,491,589 | B2 | 11/2016 | Schrader et al. |
| 2001/0005681 | A1 | 6/2001 | Kim |
| 2001/0039587 | A1 | 11/2001 | Uhler et al. |
| 2002/0026478 | A1 | 2/2002 | Rodgers |
| 2002/0044149 | A1 | 4/2002 | McCarthy et al. |
| 2003/0003907 | A1 | 1/2003 | Lai et al. |
| 2003/0139192 | A1 | 7/2003 | Chmaytelli et al. |
| 2003/0187803 | A1 | 10/2003 | Pitt |
| 2004/0007916 | A1 | 1/2004 | Awada et al. |
| 2004/0015940 | A1 | 1/2004 | Heisey et al. |
| 2004/0039909 | A1 | 2/2004 | Cheng |
| 2004/0166878 | A1 | 8/2004 | Erskine et al. |
| 2004/0192352 | A1 | 9/2004 | Vallstrom et al. |
| 2004/0203576 | A1 | 10/2004 | Droste et al. |
| 2005/0012640 | A1 | 1/2005 | Kong et al. |
| 2005/0037775 | A1 | 2/2005 | Moeglein et al. |
| 2005/0055567 | A1 | 3/2005 | Libin et al. |
| 2005/0059418 | A1 | 3/2005 | Northcutt |
| 2005/0070276 | A1 | 3/2005 | McGarry |
| 2005/0107114 | A1 | 5/2005 | Ocock et al. |
| 2005/0138110 | A1 | 6/2005 | Redlich et al. |
| 2005/0143171 | A1 | 6/2005 | Loose |
| 2005/0210104 | A1 | 9/2005 | Torvinen |
| 2005/0222768 | A1 | 10/2005 | Tauchi et al. |
| 2006/0046706 | A1 | 3/2006 | Lin et al. |
| 2006/0053389 | A1 | 3/2006 | Michelman |
| 2006/0099969 | A1 | 5/2006 | Staton et al. |
| 2006/0136998 | A1 * | 6/2006 | Oowaki et al. .................. 726/5 |
| 2006/0246872 | A1 | 11/2006 | Tarkkala |
| 2006/0253570 | A1 | 11/2006 | Biswas et al. |
| 2006/0256005 | A1 | 11/2006 | Thandu et al. |
| 2006/0271797 | A1 | 11/2006 | Ginggen et al. |
| 2006/0293057 | A1 | 12/2006 | Mazerski et al. |
| 2007/0006327 | A1 | 1/2007 | Lal et al. |

(56) References Cited

U.S. PATENT DOCUMENTS

| | | |
|---|---|---|
| 2007/0028176 A1 | 2/2007 | Perdomo et al. |
| 2007/0032225 A1 | 2/2007 | Konicek et al. |
| 2007/0042790 A1 | 2/2007 | Mohi et al. |
| 2007/0046423 A1 | 3/2007 | Baucom |
| 2007/0046456 A1 | 3/2007 | Edwards et al. |
| 2007/0064882 A1 | 3/2007 | Ger et al. |
| 2007/0067655 A1 | 3/2007 | Shuster |
| 2007/0072616 A1 | 3/2007 | Irani |
| 2007/0082707 A1 | 4/2007 | Flynt et al. |
| 2007/0091037 A1 | 4/2007 | Lee |
| 2007/0111726 A1 | 5/2007 | Lambert et al. |
| 2007/0120948 A1 | 5/2007 | Fujioka et al. |
| 2007/0150826 A1 | 6/2007 | Anzures et al. |
| 2007/0150842 A1 | 6/2007 | Chaudhri et al. |
| 2007/0168971 A1 | 7/2007 | Royzen et al. |
| 2007/0180509 A1 | 8/2007 | Swartz et al. |
| 2007/0218938 A1 | 9/2007 | Carter |
| 2007/0245398 A1 | 10/2007 | Roden |
| 2007/0264981 A1 | 11/2007 | Miller |
| 2007/0300140 A1 | 12/2007 | Makela et al. |
| 2008/0014964 A1 | 1/2008 | Sudit et al. |
| 2008/0020803 A1 | 1/2008 | Rios et al. |
| 2008/0032703 A1 | 2/2008 | Krumm et al. |
| 2008/0051079 A1 | 2/2008 | Forsgren |
| 2008/0080688 A1 | 4/2008 | Burgan et al. |
| 2008/0082693 A1 | 4/2008 | Meijer et al. |
| 2008/0096518 A1 | 4/2008 | Mock et al. |
| 2008/0096519 A1 | 4/2008 | Miegel |
| 2008/0101658 A1 | 5/2008 | Ahern et al. |
| 2008/0111698 A1 | 5/2008 | Atherton |
| 2008/0140650 A1 | 6/2008 | Stackpole |
| 2008/0154780 A1 | 6/2008 | Soukup et al. |
| 2008/0184127 A1 | 7/2008 | Rafey et al. |
| 2008/0254767 A1 | 10/2008 | Jin |
| 2008/0256170 A1 | 10/2008 | Hayashi et al. |
| 2008/0268870 A1 | 10/2008 | Houri |
| 2008/0305808 A1 | 12/2008 | Chan et al. |
| 2008/0318595 A1 | 12/2008 | Rofougaran |
| 2009/0005061 A1 | 1/2009 | Ward et al. |
| 2009/0005080 A1 | 1/2009 | Forstall et al. |
| 2009/0006566 A1 | 1/2009 | Veeramachaneni et al. |
| 2009/0006991 A1 | 1/2009 | Lindberg et al. |
| 2009/0045927 A1 | 2/2009 | Atella |
| 2009/0089886 A1 | 4/2009 | Cheng et al. |
| 2009/0093688 A1 | 4/2009 | Mathur |
| 2009/0116703 A1 | 5/2009 | Schultz |
| 2009/0119590 A1 | 5/2009 | Kondziela et al. |
| 2009/0157560 A1 | 6/2009 | Carter et al. |
| 2009/0158389 A1 | 6/2009 | Waltenberg et al. |
| 2009/0170532 A1 | 7/2009 | Lee et al. |
| 2009/0197617 A1 | 8/2009 | Jayanthi |
| 2009/0201896 A1 | 8/2009 | Davis et al. |
| 2009/0205041 A1 | 8/2009 | Michalske |
| 2009/0224931 A1 | 9/2009 | Dietz et al. |
| 2009/0265794 A1 | 10/2009 | Apelqvist |
| 2009/0270034 A1 | 10/2009 | Suzuki |
| 2009/0278738 A1 | 11/2009 | Gopinath |
| 2009/0282473 A1* | 11/2009 | Karlson et al. ............... 726/17 |
| 2009/0298475 A1 | 12/2009 | Czaja et al. |
| 2010/0001967 A1 | 1/2010 | Yoo |
| 2010/0020035 A1 | 1/2010 | Ryu et al. |
| 2010/0056124 A1 | 3/2010 | Keating et al. |
| 2010/0066821 A1 | 3/2010 | Rosener et al. |
| 2010/0069007 A1 | 3/2010 | Nagasawa |
| 2010/0074450 A1 | 3/2010 | Liao |
| 2010/0115610 A1 | 5/2010 | Tredoux et al. |
| 2010/0127836 A1 | 5/2010 | Huang et al. |
| 2010/0134310 A1 | 6/2010 | Zheng et al. |
| 2010/0162180 A1 | 6/2010 | Dunnam et al. |
| 2010/0167714 A1 | 7/2010 | Howarter et al. |
| 2010/0190479 A1 | 7/2010 | Scott et al. |
| 2010/0210301 A1 | 8/2010 | Dietz et al. |
| 2010/0216509 A1 | 8/2010 | Riemer et al. |
| 2010/0217646 A1 | 8/2010 | Siegel |
| 2010/0227588 A1 | 9/2010 | Bradley |
| 2010/0235881 A1* | 9/2010 | Liu ................... G06F 21/6218 726/3 |
| 2010/0253503 A1 | 10/2010 | Juang |
| 2010/0255856 A1 | 10/2010 | Kansal et al. |
| 2010/0268779 A1 | 10/2010 | Rao |
| 2010/0271651 A1 | 10/2010 | Kimura |
| 2010/0285815 A1 | 11/2010 | Treu et al. |
| 2010/0302028 A1 | 12/2010 | Desai et al. |
| 2010/0306832 A1 | 12/2010 | Mu et al. |
| 2010/0311336 A1 | 12/2010 | Huotari et al. |
| 2010/0313050 A1 | 12/2010 | Harrat et al. |
| 2010/0321155 A1 | 12/2010 | Ballard |
| 2010/0324819 A1 | 12/2010 | Nurminen et al. |
| 2011/0010340 A1 | 1/2011 | Hung et al. |
| 2011/0021213 A1 | 1/2011 | Carr |
| 2011/0021234 A1 | 1/2011 | Tibbitts et al. |
| 2011/0047484 A1 | 2/2011 | Mount et al. |
| 2011/0063098 A1 | 3/2011 | Fischer et al. |
| 2011/0065419 A1 | 3/2011 | Book et al. |
| 2011/0070829 A1 | 3/2011 | Griffin et al. |
| 2011/0088086 A1 | 4/2011 | Swink et al. |
| 2011/0093161 A1 | 4/2011 | Zhou et al. |
| 2011/0111728 A1 | 5/2011 | Ferguson et al. |
| 2011/0167342 A1 | 7/2011 | De La Pena et al. |
| 2011/0167344 A1 | 7/2011 | Pan |
| 2011/0169654 A1 | 7/2011 | Ketari |
| 2011/0171958 A1 | 7/2011 | Hua et al. |
| 2011/0197160 A1 | 8/2011 | Kim et al. |
| 2011/0215903 A1 | 9/2011 | Yang et al. |
| 2011/0215952 A1 | 9/2011 | Aria et al. |
| 2011/0237221 A1 | 9/2011 | Prakash et al. |
| 2011/0241827 A1 | 10/2011 | Varoglu |
| 2011/0244837 A1 | 10/2011 | Murata et al. |
| 2011/0247045 A1 | 10/2011 | Rajagopal et al. |
| 2011/0250840 A1 | 10/2011 | Lee et al. |
| 2011/0254792 A1 | 10/2011 | Waters et al. |
| 2011/0264246 A1 | 10/2011 | Pantoja et al. |
| 2011/0267171 A1 | 11/2011 | Li et al. |
| 2011/0275321 A1 | 11/2011 | Zhou et al. |
| 2011/0276901 A1 | 11/2011 | Zambetti |
| 2011/0283185 A1 | 11/2011 | Obasanjo et al. |
| 2011/0283241 A1 | 11/2011 | Miller et al. |
| 2011/0283311 A1 | 11/2011 | Luong |
| 2011/0299422 A1 | 12/2011 | Kim et al. |
| 2011/0307166 A1 | 12/2011 | Hiestermann et al. |
| 2011/0317162 A1 | 12/2011 | DeFreez et al. |
| 2011/0319051 A1 | 12/2011 | Reitnour |
| 2011/0319094 A1 | 12/2011 | Usui et al. |
| 2012/0023573 A1 | 1/2012 | Shi |
| 2012/0046020 A1 | 2/2012 | Tomasini |
| 2012/0084691 A1 | 4/2012 | Yun |
| 2012/0084734 A1 | 4/2012 | Wilairat |
| 2012/0084737 A1 | 4/2012 | Gimpl et al. |
| 2012/0089217 A1 | 4/2012 | Mews et al. |
| 2012/0098768 A1 | 4/2012 | Bendewald et al. |
| 2012/0100895 A1 | 4/2012 | Priyantha et al. |
| 2012/0115512 A1 | 5/2012 | Grainger et al. |
| 2012/0144468 A1 | 6/2012 | Pratt et al. |
| 2012/0146850 A1 | 6/2012 | Liu |
| 2012/0166452 A1 | 6/2012 | Tseng |
| 2012/0166548 A1 | 6/2012 | Gropper |
| 2012/0234058 A1 | 9/2012 | Neil et al. |
| 2012/0242906 A1 | 9/2012 | Shintani et al. |
| 2012/0244883 A1 | 9/2012 | Tibbitts et al. |
| 2012/0245838 A1 | 9/2012 | Van Doorselaer |
| 2012/0252418 A1 | 10/2012 | Kandekar et al. |
| 2012/0268249 A1 | 10/2012 | Kansal |
| 2012/0282887 A1 | 11/2012 | Khoo et al. |
| 2012/0289217 A1 | 11/2012 | Riemer et al. |
| 2012/0302256 A1 | 11/2012 | Pai et al. |
| 2012/0306637 A1 | 12/2012 | McGough et al. |
| 2012/0317162 A1 | 12/2012 | Endsley et al. |
| 2013/0006469 A1 | 1/2013 | Green et al. |
| 2013/0023246 A9 | 1/2013 | Ellingham et al. |
| 2013/0031601 A1 | 1/2013 | Bott |
| 2013/0036211 A1 | 2/2013 | Messer et al. |
| 2013/0040629 A1 | 2/2013 | Sprigg et al. |
| 2013/0040654 A1 | 2/2013 | Parish |
| 2013/0040711 A1 | 2/2013 | Kim et al. |

(56) References Cited

U.S. PATENT DOCUMENTS

| | | | |
|---|---|---|---|
| 2013/0072172 A1 | 3/2013 | Chang et al. |
| 2013/0084847 A1 | 4/2013 | Tibbitts et al. |
| 2013/0093707 A1 | 4/2013 | Park et al. |
| 2013/0130742 A1 | 5/2013 | Dietz et al. |
| 2013/0188503 A1 | 7/2013 | Anepu et al. |
| 2013/0225151 A1 | 8/2013 | King |
| 2013/0225152 A1 | 8/2013 | Matthews, III |
| 2013/0227431 A1 | 8/2013 | Vasudevan |
| 2013/0295872 A1 | 11/2013 | Guday et al. |
| 2013/0295913 A1 | 11/2013 | Matthews, III et al. |
| 2013/0298037 A1 | 11/2013 | Matthews |
| 2013/0303143 A1 | 11/2013 | Schrader |
| 2013/0305319 A1 | 11/2013 | Matthews |
| 2013/0305354 A1 | 11/2013 | King |
| 2014/0068755 A1 | 3/2014 | King et al. |
| 2014/0189608 A1 | 7/2014 | Shuttleworth et al. |
| 2014/0199966 A1 | 7/2014 | Schushan |
| 2015/0011203 A1 | 1/2015 | Schrader |
| 2015/0074615 A1 | 3/2015 | Han et al. |
| 2015/0213252 A1 | 7/2015 | Wilairat |
| 2015/0286840 A1 | 10/2015 | Karlson et al. |
| 2016/0248906 A1 | 8/2016 | Schrader et al. |
| 2016/0328902 A1 | 11/2016 | Matthews et al. |

FOREIGN PATENT DOCUMENTS

| | | |
|---|---|---|
| CN | 101617304 | 12/2009 |
| CN | 101778165 | 7/2010 |
| CN | 101815116 | 8/2010 |
| CN | 101828162 | 9/2010 |
| CN | 102239459 | 11/2011 |
| CN | 102239740 | 11/2011 |
| EP | 2169946 | 3/2010 |
| EP | 2293016 | 3/2011 |
| EP | 2369864 | 9/2011 |
| EP | 2451139 | 5/2012 |
| EP | 2469442 | 6/2012 |
| JP | 07203015 | 8/1995 |
| JP | 2002142010 | 5/2002 |
| JP | 2002530783 | 9/2002 |
| JP | 2003032353 | 1/2003 |
| JP | 2005340976 | 12/2005 |
| JP | 2006146598 | 6/2006 |
| JP | 2007257140 | 10/2007 |
| JP | 2009017239 | 1/2009 |
| JP | 2009521753 | 6/2009 |
| JP | 2009172239 | 8/2009 |
| JP | 2010503082 | 1/2010 |
| JP | 2011199637 | 10/2011 |
| JP | 2011216043 | 10/2011 |
| JP | 2013041512 | 2/2013 |
| JP | 2013540321 | 10/2013 |
| KR | 20050037613 | 4/2005 |
| KR | 20100083396 | 7/2010 |
| KR | 20110119283 | 2/2011 |
| KR | 20110093528 | 8/2011 |
| WO | WO-2005031544 | 4/2005 |
| WO | WO-2006054858 | 5/2006 |
| WO | WO-2006088273 | 8/2006 |
| WO | WO-2006099535 | 9/2006 |
| WO | WO-2007130123 | 11/2007 |
| WO | WO-2009105666 | 8/2009 |
| WO | WO-2010065752 | 6/2010 |
| WO | WO-2010147610 | 12/2010 |
| WO | WO-2011035390 | 3/2011 |
| WO | WO-2011135359 | 11/2011 |
| WO | WO-2012047412 | 4/2012 |
| WO | WO-2013061156 | 5/2013 |

OTHER PUBLICATIONS

"BroadCloud FamilyCenter", BroadSoft Data Sheet—retrieved from <http://www.broadsoft.com/pdf/datasheet-broadcloud-familycenter.pdf> on Dec. 13, 2011, 1 page.

"CameraLock Cydia Tweak—Add a Camera Button to Your Lockscreen Without iOS 5—iPhone & iPpd Touch", Retrieved from: https://www.youtube.com/watch?v=ECGm54OB6e0, Jun. 21, 2011, 1 page.

"Corrected Notice of Allowance", U.S. Appl. No. 13/726,097, Aug. 21, 2014, 2 pages.

"Corrected Notice of Allowance", U.S. Appl. No. 13/726,097, Oct. 1, 2014, 2 pages.

"Distracted Driving Information Clearinghouse", Retrieved from <http://www.fcc.gov/encyclopedia/distracted-driving-information-clearinghouse>, Jul. 27, 2011, 4 pages.

"EP Search Report", EP Application No. 09747072.8, Jan. 17, 2003, 5 Pages.

"Extended European Search Report", EP Application No. 12859600.4, May 13, 2015, 7 pages.

"Final Office Action", U.S. Appl. No. 12/194,213, Sep. 20, 2011, 11 Pages.

"Final Office Action", U.S. Appl. No. 12/417,752, Feb. 25, 2014, 22 Pages.

"Final Office Action", U.S. Appl. No. 12/417,752, Jul. 17, 2013, 18 pages.

"Final Office Action", U.S. Appl. No. 12/417,752, Sep. 13, 2012, 18 pages.

"Final Office Action", U.S. Appl. No. 12/912,456, Jan. 9, 2013, 21 pages.

"Final Office Action", U.S. Appl. No. 12/912,456, Sep. 6, 2013, 22 pages.

"Final Office Action", U.S. Appl. No. 13/090,474, Nov. 21, 2013, 12 pages.

"Final Office Action", U.S. Appl. No. 13/090,474, Nov. 25, 2014, 13 pages.

"Final Office Action", U.S. Appl. No. 13/222,538, May 28, 2013, 43 pages.

"Final Office Action", U.S. Appl. No. 13/726,027, Jan. 5, 2015, 19 pages.

"Final Office Action", U.S. Appl. No. 13/726,043, Mar. 3, 2015, 19 pages.

"Final Office Action", U.S. Appl. No. 13/726,090, Oct. 2, 2014, 30 pages.

"Final Office Action", U.S. Appl. No. 13/726,095, May 8, 2015, 13 pages.

"Final Office Action", U.S. Appl. No. 13/726,099, May 8, 2015, 11 pages.

"Final Office Action", U.S. Appl. No. 13/726,099, Aug. 29, 2014, 10 pages.

"Final Office Action", U.S. Appl. No. 13/875,139, May 9, 2014, 15 Pages.

"Foreign Notice of Allowance", AU Application No. 2011312743, Nov. 25, 2014, 2 Pages.

"Foreign Notice of Allowance", CN Application No. 200980128048.8, Jun. 28, 2014, 6 Pages.

"Foreign Office Action", AU Application No. 2011312743, Aug. 15, 2014, 4 Pages.

"Foreign Office Action", AU Application No. 2011312743, Jun. 20, 2014, 4 Pages.

"Foreign Office Action", CL Application No. 201300886, Feb. 2, 2015, 7 pages.

"Foreign Office Action", CN Application No. 200980128048.8, May 6, 2013, 7 Pages.

"Foreign Office Action", CN Application No. 200980128048.8, Dec. 2, 2013, 7 pages.

"Foreign Office Action", CN Application No. 200980128048.8, Dec. 19, 2012, 11 Pages.

"Foreign Office Action", CN Application No. 201110317851.5, Nov. 14, 2014, 15 Pages.

"Foreign Office Action", CN Application No. 201110317851.5, Dec. 4, 2013, 14 pages.

"Foreign Office Action", CN Application No. 201110317851.5, May 8, 2014, 10 Pages.

"Foreign Office Action", EP Application 12859972.7, May 26, 2015, 4 pages.

"Foreign Office Action", EP Application No. 11831134.9, May 9, 2014, 3 Pages.

(56) References Cited

OTHER PUBLICATIONS

"Foreign Office Action", EP Application No. 12859485.0, Feb. 12, 2015, 5 pages.
"Foreign Office Action", EP Application No. 12860631.6, Feb. 16, 2015, 5 pages.
"How can I see a list of all users on the logon screen?", Retrieved from <http://superuser.com/questions/354856/how-can-i-see-a-list-of-all-users-on-the-logon-screen> on Jan. 6, 2015, Nov. 7, 2011, 2 pages.
"How can one add an image to the windows 7 login screen? A", Retrieved from <http://superuser.com/questions/470568/how-can-one-add-an-image-to-the-windows-7-login-screen > on Jan. 6, 2015., Sep. 5, 2012, 4 pages.
"iCloud: What You Need to Know", MacWorld.com—retrieved from <http://www.macworld.com/article/160380/2011/06/icloud_what_you_need_to_know.html > on Dec. 13, 2011, Jun. 8, 2011, 16 pages.
"Ignite Where & Launch Pad", O'Reilly, Where 2.0 Conference 2008, retrieved from <http://en.oreilly.com/where2008/public/schedule/detail/2572> on Feb. 5, 2009, May 2008, 4 pages.
"In Case of Emergency (ICE) and smart phone with lock screens", Ars Technica Open Forum—Retrieved at: http://arstechnica.com/civis/viewtopic.php?f=20&t=1140661, Mar. 29, 2011, 8 pages.
"International Search Report and Written Opinion", Application No. PCT/US2012/071559, Mar. 28, 2013, 10 pages.
"International Search Report and Written Opinion", Application No. PCT/US2012/071546, Apr. 29, 2013, 10 pages.
"International Search Report and Written Opinion", Application No. PCT/US2013/050963, Nov. 8, 2013, 14 pages.
"International Search Report and Written Opinion", Application No. PCT/US2011/049614, Mar. 26, 2012, 7 pages.
"International Search Report and Written Opinion", Application No. PCT/US2009/039509, Nov. 18, 2009, 8 Pages.
"International Search Report and Written Opinion", Application No. PCT/US2012/071545, Mar. 28, 2013, 9 pages.
"International Search Report and Written Opinion", Application No. PCT/US2012/071557, Mar. 28, 2013, 9 pages.
"International Search Report and Written Opinion", Application No. PCT/US2012/071562, Apr. 24, 2013, 9 pages.
"International Search Report and Written Opinion", Application No. PCT/US2012/071555, Apr. 25, 2013, 9 pages.
"International Search Report and Written Opinion", Application No. PCT/US2012/034598, Oct. 12, 2012, 9 pages.
"iPad Parental Control (restricting app access)", iPad Reviews, Jailbreak Guides; last retrieved from http://ipaded.net/ipad/parental-control/ on Feb. 29, 2012, 5 pages.
"Mobile Phone Match-Up", Retrieved at: <http://www.microsoft.com/windowsmobile/enus/meet/version-compare.mspx>, Jul. 27, 2010, 4 pages.
"Mobile Task Tracker Screen Shots", Retrieved from <http://www.mobiletasktracker.com/Screen%20Shots.html>, Jul. 13, 2011, 4 Pages.
"No Tech Panacea for Tech-Distracted Driving", http://mobile.slashdot.org/story/12/06/11/0556231/no-tech-panacea-for . . . , Dec. 6, 2011, 30 Pages.
"Non-Final Office Action", U.S. Appl. No. 12/194,213, Mar. 17, 2011, 11 Pages.
"Non-Final Office Action", U.S. Appl. No. 12/417,752, Feb. 25, 2014, 22 pages.
"Non-Final Office Action", U.S. Appl. No. 12/417,752, Oct. 29, 2013, 16 Pages.
"Non-Final Office Action", U.S. Appl. No. 12/417,752, May 24, 2013, 17 pages.
"Non-Final Office Action", U.S. Appl. No. 12/417,752, Jun. 28, 2011, 14 pages.
"Non-Final Office Action", U.S. Appl. No. 12/897,586, May 8, 2014, 12 pages.
"Non-Final Office Action", U.S. Appl. No. 12/912,456, May 4, 2012, 14 pages.
"Non-Final Office Action", U.S. Appl. No. 12/912,456, May 29, 2013, 20 pages.
"Non-Final Office Action", U.S. Appl. No. 12/912,456, Sep. 11, 2012, 15 pages.
"Non-Final Office Action", U.S. Appl. No. 13/090,474, Apr. 26, 2013, 11 pages.
"Non-Final Office Action", U.S. Appl. No. 13/090,474, May 6, 2014, 12 pages.
"Non-Final Office Action", U.S. Appl. No. 13/222,538, Feb. 14, 2013, 33 Pages.
"Non-Final Office Action", U.S. Appl. No. 13/222,538, Oct. 11, 2013, 38 pages.
"Non-Final Office Action", U.S. Appl. No. 13/328,312, Aug. 6, 2013, 18 pages.
"Non-Final Office Action", U.S. Appl. No. 13/726,027, Jun. 24, 2014, 17 pages.
"Non-Final Office Action", U.S. Appl. No. 13/726,040, Jan. 28, 2015, 14 pages.
"Non-Final Office Action", U.S. Appl. No. 13/726,043, Sep. 11, 2014, 14 pages.
"Non-Final Office Action", U.S. Appl. No. 13/726,048, Dec. 9, 2014, 12 pages.
"Non-Final Office Action", U.S. Appl. No. 13/726,049, Dec. 4, 2014, 9 pages.
"Non-Final Office Action", U.S. Appl. No. 13/726,090, Jun. 24, 2014, 28 pages.
"Non-Final Office Action", U.S. Appl. No. 13/726,092, Feb. 12, 2015, 21 pages.
"Non-Final Office Action", U.S. Appl. No. 13/726,095, Jan. 5, 2015, 14 pages.
"Non-Final Office Action", U.S. Appl. No. 13/726,095, Aug. 15, 2014, 12 pages.
"Non-Final Office Action", U.S. Appl. No. 13/726,099, Jan. 7, 2015, 10 pages.
"Non-Final Office Action", U.S. Appl. No. 13/726,099, Mar. 18, 2014, 8 pages.
"Non-Final Office Action", U.S. Appl. No. 13/875,139, Oct. 3, 2013, 12 pages.
"Non-Final Office Action", U.S. Appl. No. 13/875,139, Oct. 24, 2014, 15 Pages.
"Notice of Allowance", U.S. Appl. No. 12/194,213, May 31, 2013, 11 Pages.
"Notice of Allowance", U.S. Appl. No. 12/194,213, Jun. 27, 2012, 16 Pages.
"Notice of Allowance", U.S. Appl. No. 12/194,213, Dec. 21, 2012, 13 Pages.
"Notice of Allowance", U.S. Appl. No. 12/897,586, Jan. 5, 2015, 7 Pages.
"Notice of Allowance", U.S. Appl. No. 12/897,586, Oct. 15, 2014, 13 Pages.
"Notice of Allowance", U.S. Appl. No. 12/912,456, Jan. 7, 2014, 9 Pages.
"Notice of Allowance", U.S. Appl. No. 13/726,097, Jun. 10, 2014, 7 pages.
"Notice of Allowance", U.S. Appl. No. 13/875,139, Mar. 5, 2015, 7 pages.
"Parental Control Software for Cell Phones", retrieved from <http://www.parentalcontrolcellphones.com/> on Dec. 8, 2011, Apr. 30, 2010, 5 pages.
"Restrict Access to Applications using AppLocker", Retrieved from: <http://www.dq.winsila.com/tips-tricks/restrict-access-to-applications-using-applocker.html> on Feb. 13, 2012, Jan. 5, 2012, 2 pages.
"Restrict Access to Programs with AppLocker in Windows 7", Retrieved from <http://www.howtogeek.com/howto/6317/block-users-from-using-certain-applications-with-applocked> on Jan. 6, 2015., Nov. 12, 2009, 9 pages.
"Restriction Requirement", U.S. Appl. No. 13/726,048, Jun. 20, 2014, 5 pages.
"Restriction Requirement", U.S. Appl. No. 13/726,049, Jul. 1, 2014, 6 pages.
"Restriction Requirement", U.S. Appl. No. 13/726,097, Mar. 21, 2014, 7 pages.

(56) References Cited

OTHER PUBLICATIONS

"Safe Driving System", Retrieved from <http://web.archive.org/web/20100512220953/http://key2safedriving .com/>, May 12, 2010, 2 pages.
"Setting up and Using Smart Unlock on the Samsung Jet", Retrieved at: <http://www.knowyourmobile.com/samsung/samsungjet/samsungjetuserguides/317988/setting_up_and_using_smart_unlock_on_the_samsung_jet.html>, Jun. 20, 2010, 2 pages.
"Setting Up Simple Restricted Access", Retrieved at: http://supportwebvanta.com/support_article/615777-setting-up-simple-restricted-access-on Feb. 29, 2012, 3 Pages.
"Supplemental Notice of Allowance", U.S. Appl. No. 12/897,586, Mar. 3, 2015, 2 Pages.
"Supplementary European Search Report", EP Application No. 12859485.0, Jan. 23, 2015, 4 pages.
"Supplementary European Search Report", EP Application No. 12859972.7, Apr. 30, 2015, 3 pages.
"Supplementary European Search Report", EP Application No. 12860631.6, Jan. 5, 2015, 3 pages.
"Supplementary Search Report", EP Application No. 11831134.9, Apr. 3, 2014, 3 pages.
"Timeline of Microsoft Windows", Retrieved from <http://en.wikipedia.org/wiki/Timeline_of_Microsoft_Windows> on Jan. 6, 2015, Dec. 14, 2014, 5 pages.
"T-Mobile G1 Google Android Phone—Gesture Unlocking", Retrieved at: <http://www.gadgetuniversegift.com/?p=2121>, Jun. 20, 2010, 2 pages.
"T-Mobile G1 User Manual", pp. 102-103, May 27, 2009, 5 pages.
"Welcome to Sprint Drive First", Retrieved at <<https://drivefirst.sprint.com/welcome.htm>> on Nov. 20, 2013, 2013, 2 pages.
"What's an Android? and Other Smart(phone) Questions", Retrieved from: <http://bestbuybusinessdistrict.com/knowlege-center/58-what%27s-an-android-and-other-smart-phone-questions> on Feb. 7, 2011, Sep. 6, 2010, 4 pages.
"Your Very Own Support Geek", retrieved from <http://yoursupportgeek.info/miscellaneous-geek-stuff/t-mobile-uk-to-offer-icd-vega-15-inch-tegra-android-tablet-in-2010> on Dec. 13, 2011, Jan. 7, 2010, 2 pages.
Aalto,"Bluetooth and WAP Push Based Location-Aware Mobile Advertising System", ACM, MobiSYS '04, Jun. 6-9, 2004, Boston, MA, retrieved from <http://www.mediateam.oulu.fi/publications/pdf/496.pdf> on Feb. 5, 2009, Jun. 6, 2004, 10 pages.
Abdelzaher,"Mobiscopes for Human Spaces", IEEE Pervasive Computing, vol. 6, No. 2, Apr. 2007, 11 pages.
Abdesslem,"Less is More: Energy-Efficient Mobile Sensing with SenseLess", MobiHeld an ACM SIGCOMM workshop, Aug. 17, 2009, pp. 61-62.
Agarwal,"Somniloquy: Augmenting Network Interfaces to Reduce PC Energy Usage", Symposium on Networked Systems Design and Implementation (NSDI), 2009, available at <http://www.usenix.org/events/nsdi09/tech/full_papers/agarwal/agarwal.pdf>, Apr. 23, 2009, pp. 365-380.
Aventail,"Aventail and Trust Digital Launch Integrated Secure Mobile Access Solution", http://findarticles.com/p/articles/mi_pwwi/is_200602/ai_n16063742/?tag=content;col1, Last accessed May 14, 2008, Feb. 2006, 3 Pages.
Azizyan,"SurroundSense: Mobile Phone Localization Using Ambient Sound and Light", retrieved from <http://synrg.ee.duke.edu/papers/surroundsense-poster.pdf> on Feb. 5, 2009, 9/22/208, 1 page.
Bahl,"RADAR: An In-Building RF-based User Location and Tracking System", Microsoft Research, Proceedings of IEEE Infocom 2000, Tel-Aviv, Israel, retrieved from <https://3research.microsoft.com/en-us/um/people/padmanab/papers/infocom2000.pdf> on Feb. 5, 2009, Mar. 2000, 10 pages.
Balakrishnan,"ITR: Scalable Location-Aware Monitoring (SLAM) Systems", Laboratory for Computer Science & Department of EECS, MIT, Cambridge, MA, retrieved from <http://nms.lcs.mit.edu/projects/slam/prop.pdf> on Feb. 5, 2009, Nov. 9, 2001, 31 pages.
Barroso,"The Case for Energy-Proportional Computing", IEEE Computer Society, vol. 40. No. 12, Dec. 2007, pp. 33-37.
Bhandari,"Full Touchscreen Samsung Star (S5233), Star 3G (S5603) and BEAT DJ Launched in India", Retrieved at: http://www.tecfre.com/full-touchscreen-samsung-star-s5233-star-3g-s5603-and-beat-dj-launched-in-india/, May 11, 2009, 12 pages.
Bilderbeek,"From Unified to Social Communications and Collaboration", retrieved from <http://www.themetisfiles.com/2011/10/from-unified-to-social-communications-and-collaboration/> on Dec. 13, 2011, Oct. 25, 2011, 4 pages.
Branscombe,"Kids Corner and Wallet", Retrieved from <http://www.techradar.com/reviews/pc-mac/software/operating-systems/windows-phone-8-1086692/review/6>, Jan. 25, 2012, 7 pages.
Burke,"Participatory Sensing", WSW at SenSys, Oct. 31, 2006, 5 pages.
Campbell,"Biometrically Enhanced Software-Defined Radios", Proc. Software Defined Radio Technical Conf, Orlando, Florida, Nov. 2003, 6 Pages.
Chen,"Here's the Google Phone Apple Wants You to Have", Retrieved at: http://www.wired.com/2010/03/apple-htc-google/, Mar. 5, 2010, 9 pages.
Chiu,"Playful Bottle: A Mobile Social Persuasion System to Motivate Healthy Water Intake", Proceedings of the 11th international conference on Ubiquitous computing, 2009, 10 pages.
Ciprian,"Manage User Accounts", Retrieved at: http://www.vista4beginners.com/Manage-User-Accounts, May 8, 2007, 13 pages.
Consolvo,"Flowers or a Robot Army?: Encouraging Awareness & Activity with Personal, Mobile Displays", Proceedings of the 10th International Conference on Ubiquitous Computing, vol. 12, No. 4, Publisher: ACM Press, Sep. 2008, 10 pages.
Constandache,"Energy-Aware Localization Using Mobile Phones", retrieved from <http://www.cs.duke.edu/~ionut/2008_mobisys.pdf> on Feb. 5, 2009, Jun. 2008, 1 page.
Constandache,"Energy-efficient Localization Via Personal Mobility Profiling", In Proceedings of MobiCASE 2009, Available at <http://synrg.ee.duke.edu/papers/mobicase09.pdf>, Oct. 2009, pp. 1-20.
Covington,"Parameterized Authentication", Proc. 9th European Symposium on Research Computer Security, Lecture notes in Computer Science, Sep. 2004, 18 Pages.
Cui,"Facilitating Consumption of Online Social Networking Services on Mobile Devices", Proceedings of the 13th international conference on Ubiquitious Computing, Sep. 17, 2011, 4 Pages.
Davies,"T-Mobile UK to Offer ICD Vega 15-inch Tegra Android Tablet in 2010", Retrieved from <http://www.slashgear.com/t-mobile-uk-to-offer-icd-vega-15-inch-tegra-android-tablet-in-2010-0768671/> on Mar. 11, 2013, Jan. 7, 2010, 7 pages.
DiPane,"Sprint to Bring Parental Locks to Android Phones to Prevent Use While Driving", retrieved from <http://www.androidcentral.com/sprint-bring-parental-locks-android-phones-prevent-use-while-driving> on Dec. 8, 2011, Mar. 22, 2011, 7 pages.
Flinn,"Extending Mobile Computer Battery Life through Energy-Aware Adaptation", School of Computer Science, Carnegie Mellon University, Pittsburgh, PA, retrieved from <http://reports-archive.adm.cs.cmu.edu/anon/2001/CMU-CS-01-171.pdf> from Feb. 5, 2009, Dec. 2001, 165 pages.
Foster,"Precision and accuracy of an ankle-worn accelerometer-based pedometer in step counting and", Preventive Medicine, vol. 41, N0. 3-4, Oct. 2005, pp. 778-783.
Gaonkar,"Micro-Blog: Sharing and Querying Content through Mobile Phones and Social Participation", ACM, MobiSys 2008, Jun. 17-20, 2008, Breckenridge, CO, retrieved from <http://www.cs.duke.edu/~lpcox/romit-microblog.pdf> on Feb. 5, 2009, Jun. 17, 2008, 13 pages.
Hoffmann,"Multilateral Security in Mobile Applications and Location Based Services", https://users.cs.jmu.edu/bernstdh/web/CS685/papers/hoffman-et-al-2002.pdf, Last accessed May 14, 2008, 2002, 18 Pages.

(56) References Cited

OTHER PUBLICATIONS

Hoh,"Virtual Trip Lines for Distributed Privacy-Preserving Traffic Monitoring",, Proceedings of the 6th International Conference on Mobile Systems, Applications, and Services, Jun. 2008, 14 pages.
Hull,"CarTel: A Distributed Mobile Sensor Computing System", Proceedings of the 4th international conference on Embedded networked sensor systems, Nov. 2006, 14 pages.
Jagadeesan,"A Novel Approach to Design of User Re-Authentication Systems", Proc. 3rd IEEE Intl. Conf. on Biometrics: Theory, Applications and Systems, Sep. 2009, 6 Pages.
Kang,"A Scalable and Energy-Efficient Context Monitoring Framework for Mobile Personal Sensor Networks", IEEE Transactions on Mobile Computing, vol. 9, No. 5, May 2010, pp. 686-702.
Kansal,"Location and Mobility in a Sensor Network of Mobile Phones", Microsoft Research, Microsoft Corporation, retrieved from <http://research.microsoft.com/apps/pubs/default.aspx?id=70416> on Feb. 5, 2009, Jun. 4, 2007, 1 pages.
Kharif,"Parental Controls for Mobile Phones? You Bet", Tech Beat, retrieved from <http://www.businessweek.com/the_thread/techbeat/archives/2005/08/parental_contro.html> on Dec. 8, 2011, Aug. 16, 2005, 12 pages.
King,"Mobile Device Child Share", U.S. Appl. No. 13/726,095, filed Mar. 21, 2013, 57 Pages.
Klosterman,"Secure Continuous Biometric-Enhanced Authentication", Technical Report, May 2000, May 2000, 25 Pages.
Kottahachchi,"Access Controls for Intelligent Environments", In: Proceedings of ISDA '04: 4th Annual International Conference on Intelligent Systems Design and Applications. Budapest, Hungary (2004), 2004, 6 Pages.
Krumm,"Predestination: Inferring Destinations from Partial Trajectories", UbiComp 2006: The Eighth International Conference on Ubiquitous Computing, Sep. 17-21, 2006, Orange County, CA, retrieved from <http://research.microsoft.com/en-us/um/people/horvitz|predestination.pdf> on Feb. 5, 2009, Sep. 17, 2006, 18 pages.
Krumm,"RightSPOT: A Novel Sense of Location for a Smart Personal Object", Proceedings of Ubicomp 2003, Seattle, WA, retrieved from <http://research.microsoft.com/en-us/um/people/horvitz/rightspot. htm> on Feb. 5, 2009, 2003, 1 pages.
LaMarca,"Place Lab: Device Positioning Using Radio Beacons in the Wild", In Proceedings of Pervasive 2005, Munich, Germany, retrieved from <http://www.placelab.org/publications/pubs/pervasive-placelab-2005-final.pdf> on Feb. 5, 2009, May 2005, 18 pages.
LeBlanc,"The Device Experience in Windows 7—UPDATED", Windows 7 Team Blog, retrieved from <http://windowsteamblog.com/windows/archive/b/windows7/archive/2009/09/01/the-device-experience-in-windows-7-updated.aspx> on Dec. 13, 2011, Sep. 1, 2009, 14 pages.
Lester,"Validated Caloric Expenditure Estimation using a Single Body-Worn Sensor", Proceedings of the 11th international conference on Ubiquitous computing, Oct. 2009, 10 pages.
Lester,"A Practical Approach to Recognizing Physical Activities", Pervasive Computing in Pervasive Computing, vol. 3968, 2006, 17 pages.
Liao,"Extracting Places and Activities from GPS Traces Using Hierarchical Conditional Random Fields", The International Journal of Robotics Research, vol. 26, No. 1, 119-134, retrieved from <http://ijr.sagepub.com/cgi/content/26/1/119> on Feb. 5, 2009, 2007, 20 pages.
Lifehacker,"Get the Most Out of Your iPhone's Notification Center, from Beginner to Jailbreaker", Available online at <http://lifehacker.com/5882947/get-the-most-out-of-ios-Ss-notification-center-frombeginner-to-jailbreakerl>, retrieved on Jul. 29, 2014, Feb. 7, 2012, 8 pages.
Lin,"Enabling Energy-Efficient and Quality Localization Services", National Taiwan University, retrieved from <http://nslab.ee.ntu.edu.tw/publication/conf/qols-percom06.pdf> on Feb. 5, 2009, 2006, 4 pages.
Lin,"Energy-Accuracy Trade-off for Continuous Mobile Device Location", In Proceedings of ACM Mobisys 2010, Available at <http://research.microsoft.com/apps/pubs/default.aspx?id=120831>, Jun. 15, 2010, pp. 1-14.
Liu,"xShare: Supporting Impromptu Sharing of Mobile Phones", In Proceedings of the 7th international conference on Mobile systems, applications, and services, Jun. 22, 2009, pp. 15-28.
Lu,"Sound Sense: Scalable Sound Sensing for People-Centric Sensing Applications on Mobile Phones", Proceedings of the 7th international conference on Mobile systems, applications, and services, Jun. 2009, 14 pages.
McGlaun,"Fixes for Distracted Driving Remain Unclear", http://www.dailytech.com/article.aspx?newsid=24903, Jun. 12, 2012, 2 Pages.
Mohan,"Nericell: Rich Monitoring of Road and Traffic Conditions using Mobile Smartphones", Proceedings of the 6th ACM conference on Embedded network sensor systems, Nov. 2008, 14 pages.
Moran,"Getting Started with Windows 7", 2009, 412 pages.
Mui,"The Lifesaving Smartphone Feature That We Need: Driving Mode", Retrieved from <http://www.forbes.com/sites/chunkamui/2011/12/19/the-smart-phone-feature-that-we-need-driving-mode/>, Dec. 19, 2011, 4 pages.
Nasar,"Mobile Telephones, Distracted Attention, and Pedestrian Safety", Accident Analysis & Prevention, retrieved from <http://facweb.knowlton.ohiostate.edu/jnasar/crpinfo/research/MobilePhones_AAP_2007.pdf> on Dec. 8, 2011, Jan. 2008, pp. 69-75.
Niino,"There was free enterprise microblogging, Japanese were developed "youRoom!" Free plan upgrade just mutter", Retrieved from <http://www.publickey1.jp/blog/10/youroom.html>, Dec. 21, 2010, 4 Pages.
Oliver,"Health Gear: A Real-Time Wearable System for Monitoring and Analyzing Physiological Signals", Apr. 2006, pp. 1-4.
OSXDaily,"How to Use the lock Screen Camera in iOS 5.1", Available online at <http://osxdaily.com/2012/03/08/lock-screen-camera-ios-5-1>, retrieved on Jul. 29, 2014, Mar. 8, 2012, 10 pages.
Paek,"Energy-Efficient Rate-Adaptive GPS-based Positioning for Smartphones", In Proceedings of MobiSys 2010, Available at <http://enl.usc.edu/papers/cache/Paek10a.pdf>, Jun. 2010, 16 pages.
Patten,"Using Mobile Telephones: Cognitive Workload and Attention Resource Allocation", Accident Analysis and Prevention, retrieved from <http://beta.nsc.org/safety_road/Distracted_Driving/Documents/Using%20mobile%20telephones,%20cognitive%20workload%20and%20attention%20resource%20allocation.pdf> on Dec. 8, 2011, May 2004, pp. 341-350.
Peng,"BeepBeep: A High Accuracy Acoustic Ranging System Using COTS Mobile Devices", ACM, SenSys 2007, Nov. 6-9, 2007, Sydney, Australia, retrieved from <http://research.microsoft.com/en-us/groups/wn/sensys106-beepbeep.pdf> on Feb. 5, 2009, Nov. 6, 2007, 14 pages.
Pering,"The PSI Board: Realizing a Phone-Centric Body Sensor Network", In 4th International Workshop on Wearable and Implantable Body Sensor Networks, 2007, 6 pages.
Person,"Writing Your Own GPS Applications: Part 2", The Code Project, retrieved from <http://www.codeproject.com/KB/mobile/WritingGPSApplications2.aspx> on Feb. 5, 2009, Dec. 20, 2004, 13 pages.
Quick,"BizzTrust for Android splits a single smartphone into two virtual phones", http://www.gizmag.com/bizztrust-for-android/20114/, Retrieved on Jan. 10, 2012, Oct. 2011, 4 Pages.
Raja,"How to Replace and Customize Android Lock Screen [Guide]", Retrieved at: http://www.addictivetips.com/mobile/how-to-replace-and-customize-android-lock-screen-guide/, Jun. 10, 2011, 14 pages.
Riva,"The Urbanet Revolution: Sensor Power to the People!", IEEE Pervasive Computing, vol. 6, No. 2, Apr. 2007, pp. 41-49.
Ruairi,"An Energy-Efficient, Multi-Agent Sensor Network for Detecting Diffuse Events", IJCAI-07—retrieved from <http://www.aaai.org/Papers/IJCAI/2007/IJCAI07-224.pdf> on Feb. 5, 2009, 2007, pp. 1390-1395.
Saenz,"Unlock Your Door with Your Phone, Text a Key to a Friend—Lockitron is Awesome (video)", Retrieved from: <http://singularityhub.com/2011/05/24/unlock-your-door-with-your-

(56) References Cited

OTHER PUBLICATIONS phone-text-a-key-to-a-friend-lockitron-is-awesome-video/> on Feb. 10, 2012, May 24, 2011, 3 pages.

Samberg,"Stay Focused While Driving", Retrieved from <<http://www.verizonwireless.com/news/2012/09/safely-go-driving-app.html>> on Nov. 20, 2013, Sep. 13, 2012, 5 pages.

Schindler,"City-Scale Location Recognition", IEEE Computer Society Conference on Computer Vision and Pattern Recognition (CVPR), retrieved from <http://www.cc.gatech.edu/~phlosoft/files/schindler07cypr2.pdf> on Feb. 5, 2009, 2007, 7 pages.

Shin,"DEAMON: Energy-efficient sensor monitoring", 6th Annual IEEE Communications Society Conference on Sensor, Mesh and Ad Hoc Communications and Networks, Jun. 22, 2009, 9 pages.

Simonite,"One Smart Phone, Two Personalities", http://www.technologyreview.com/communications/38865/, Retrieved Jan. 10, 2012, Oct. 13, 2011, 3 Pages.

Smailagic,"Location Sensing and Privacy in a Context-Aware Computing Environment", IEEE Wireless Communications—retrieved from <http://diuf.unifr.ch/pai/education/2002_2003/sem inar/winter/telecom/01043849.pdf> on Feb. 5, 2009, Oct. 2002, pp. 10-17.

Stajano,"One user, many hats; and, sometimes, no hat?towards a secure yet usable pda", Security Protocols Workshop, Springer Verlag, 2004, 14 Pages.

Sun,"Signal Processing Techniques in Network-aided Positioning", IEEE Signal Processing Magazine—Available at <http://www.cspl.umd.edu/sig/publications/sun_survey_200507.pdf>, Jul. 2005, pp. 12-23.

Talbot,"App Battles Driver Distraction but Spares Passengers", Technology Review India published by MIT, http://www.technologyreview.in/news/426889/app-battles-driver-distraction-but-spares-passengers, Feb. 14, 2012, 2 pages.

Temporale,"Removing Application Lock on Windows Mobile Standard Devices", http://www.mobilejaw.com/articles/2009/09/removing-application-lock-on-windows-mobile-standard-devices/, Retrieved on Oct. 13, 2011, Sep. 4, 2009, 10 Pages.

Tiemann,"AT&T Adds Parental Control Options to Cell Phones", CNET News—retrieved from <http://news.cnet.com/8301-13507_3-9770506-18.html> on Dec. 8, 2011, Sep. 7, 2007, 1 pages.

Wang,"A Framework of Energy Efficient Mobile Sensing for Automatic User State Recognition", Proceedings of the 7th international conference on Mobile systems, applications, and services, Jun. 2009, 14 pages.

Warren,"Microsoft Flaunts Metro Style PowerPoint Live Tiles", WinRumors—retrieved from <http://www.winrumors.com/microsoft-flaunts-metro-style-powerpoint-live-tiles-video/> on Dec. 13, 2011, Jul. 11, 2011, 12 pages.

Weilenmann,"Local Use and Sharing of Mobile Phones", In B. Brown, N. Green & R. Harper (Eds.) Wireless World: Social and Interactional Aspects of the Mobile Age. Godalming and Hiedleburg: Springer Verlag, 2001, pp. 99-115.

Williams,"AT&T Drive Mode, The Anti-Texting While Driving Mobile Solution (video)", Retrieved from <http://www.talkandroid.com/66579-att-drive-mode-the-anti-texting-while-driving-mobile-solution-video/>, Oct. 13, 2011, 6 pages.

Wood,"Hey, Phone Makers: Where's 'Driving Mode'?", Retrieved from <http://news.cnet.com/8301-31322_3-20003824-256.html>, Apr. 29, 2010, 3 pages.

Woodman,"Pedestrian Localisation for Indoor Environments", Proceedings of the 10th international conference on Ubiquitous computing, Sep. 2008, 10 pages.

Youssef,"The Horus WLAN Location Determination System", Department of Computer Science, University of Maryland, retrieved from <http://www.cs.umd.edu/~moustafa/papers/horus_usenix.pdf> on Feb. 5, 2009, 2005, 14 pages.

Yu,"Personalized Awareness and Safety with Mobile Phones as Sources and Sinks", Proceedings of Urbansense, workshop held in conjunction with SenSys, Nov. 4, 2008, pp. 26-30.

Zaplata,"Context-based Cooperation in Mobile Business Environments—Managing the Distributed Execution of Mobile Processes", Business & Information Systems Engineering, Apr. 2009, pp. 301-314.

Zhang,"The Two Facets of the Exploration-Exploitation Dilemma", Proceedings of the IEEE/WIC/ACM International Conference on Intelligent Agent Technology (IAT '06), retrieved from <http://ieeexplore.ieee.org/ielx5/4052878/4052879/04052945.pdf?tp=> on Feb. 5, 2009, 2006, 7 pages.

Zhuang,"Improving Energy Efficiency of Location Sensing on Smartphones", In Proceedings of MobiSys 2010—Available at <http://www.deutsche-telekom-laboratories.com/~kyuhan/papers/MobiSys10Kim.pdf>, Jun. 2010, 15 pages.

"Final Office Action", U.S. Appl. No. 13/726,048, Aug. 5, 2015, 13 pages.

"Foreign Office Action", IL Application No. 2218582, Aug. 13, 2015, 6 pages.

"Non-Final Office Action", U.S. Appl. No. 13/726,027, Aug. 13, 2015, 20 pages.

"Non-Final Office Action", U.S. Appl. No. 13/726,040, Aug. 25, 2015, 16 pages.

"Notice of Allowance", U.S. Appl. No. 13/726,095, Aug. 28, 2015, 6 pages.

"Notice of Allowance", U.S. Appl. No. 13/726,099, Sep. 17, 2015, 8 pages.

Hayama,"Windows Vista Home Premium/Home Basic/Business", Mar. 21, 2007, 34 pages.

"Corrected Notice of Allowance", U.S. Appl. No. 14/495,418, Feb. 25, 2016, 2 pages.

"Corrected Notice of Allowance", U.S. Appl. No. 14/495,418, Feb. 29, 2016, 2 pages.

"Final Office Action", U.S. Appl. No. 13/726,031, Apr. 13, 2015, 14 pages.

"Final Office Action", U.S. Appl. No. 13/726,040, Dec. 1, 2015, 18 pages.

"Final Office Action", U.S. Appl. No. 13/726,049, Feb. 1, 2016, 15 pages.

"Final Office Action", U.S. Appl. No. 13/726,090, Dec. 15, 2015, 34 pages.

"Foreign Notice of Allowance", JP Application No. 2013-532806, Oct. 2, 2015, 4 pages.

"Foreign Office Action", EP Application No. 12860403.0, May 20, 2015, 4 pages.

"Foreign Office Action", IL Application No. 225450, Aug. 13, 2015, 6 pages.

"International Search Report and Written Opinion", Application No. PCT/US2012/071544, Feb. 27, 2013, 9 pages.

"Location-Based Social Networking Marketing White Paper", The Marketer's Guide to Location-Based Social Networks, Anvil Media, Inc., 2010, 14 pages.

"Non-Final Office Action", U.S. Appl. No. 13/726,031, Jul. 8, 2014, 13 pages.

"Non-Final Office Action", U.S. Appl. No. 13/726,031, Aug. 27, 2015, 17 pages.

"Non-Final Office Action", U.S. Appl. No. 13/726,043, Oct. 8, 2015, 20 pages.

"Non-Final Office Action", U.S. Appl. No. 13/726,048, Nov. 20, 2015, 14 pages.

"Non-Final Office Action", U.S. Appl. No. 14/746,763, Nov. 6, 2015, 11 pages.

"Notice of Allowance", U.S. Appl. No. 13/726,040, Feb. 18, 2016, 5 pages.

"Notice of Allowance", U.S. Appl. No. 13/726,092, Oct. 8, 2015, 7 pages.

"Notice of Allowance", U.S. Appl. No. 14/495,418, Feb. 5, 2016, 7 pages.

"Notice of Allowance", U.S. Appl. No. 14/495,418, Oct. 7, 2015, 7 pages.

"Supplementary European Search Report", EP Application No. 12860403.0, May 4, 2015, 3 pages.

Cramer,"Performing a Check-in: Emerging Practices, Norms and 'Conflicts' in Location-Sharing Using Foursquare", MOBILECHII 2011, ACM, 2011, 10 pages.

(56) References Cited

OTHER PUBLICATIONS

Morton,"6 Geolocation Apps You May Not Have Heard About", retrieved from <http://www.r2integrated.com/blog/index.php/6-geolocation-apps-you-may-not-have-heard-of/> on Dec. 9, 2011, Mar. 27, 2011, 4 pages.
Sadeh,"Understanding and Capturing People's Privacy Policies in a People Finder Application", Personal and Ubiquitous Computing vol. 13 Issue 6, Aug. 2009, retrieved from <http://www.casos.cs.cmu.edu/publications/papers/2009UnderstandingCapturingPeoples.pdf> on Dec. 9, 2011, Aug. 2009, 13 pages.
"Non-Final Office Action", U.S. Appl. No. 14/746,763, Jun. 30, 2016, 6 pages.
"Non-Final Office Action", U.S. Appl. No. 15/143,731, Jul. 27, 2016, 18 pages.
"Notice of Allowance", U.S. Appl. No. 13/726,043, Aug. 16, 2016, 8 pages.
"Notice of Allowance", U.S. Appl. No. 13/726,049, Jul. 18, 2016, 8 pages.
"Notice of Allowance", U.S. Appl. No. 14/495,418, Jul. 11, 2016, 7 pages.
"Summons to Attend Oral Proceedings", EP Application No. 12859485.0, Jul. 4, 2016, 12 pages.
"Supplemental Notice of Allowance", U.S. Appl. No. 14/495,418, Aug. 12, 2016, 2 pages.
"Extended European Search Report", EP Application No. 12883789.5, Apr. 22, 2016, 7 pages.
"Final Office Action", U.S. Appl. No. 13/726,027, Apr. 14, 2016, 21 pages.
"Foreign Office Action", CN Application No. 201280064066.6, Jan. 21, 2016, 12 pages.
"Foreign Office Action", EP Application No. 12860631.6, Apr. 21, 2016, 5 pages.
"How to Set Up an ICE Contact on Your iPhone", Retrieved at: https://rnn10.wordpress.com/2010/06/21/how-to-set-up-an-ice-contact-on-your-iphone/, Jun. 21, 2010, 14 pages.
"International Preliminary Report on Patentability", Application No. PCT/US2012/071562, Mar. 12, 2015, 6 pages.
"International Preliminary Report on Patentability", Application No. PCT/US2012/071545, Jul. 3, 2014, 6 pages.
"International Preliminary Report on Patentability", Application No. PCT/US2012/071557, Jul. 3, 2014, 6 pages.
"International Preliminary Report on Patentability", Application No. PCT/US2012/071546, Jul. 3, 2014, 7 pages.
"International Preliminary Report on Patentability", Application No. PCT/US2012/071559, Jul. 3, 2014, 7 pages.
"Non-Final Office Action", U.S. Appl. No. 13/726,090, Jun. 3, 2016, 21 pages.
"Non-Final Office Action", U.S. Appl. No. 13/726,099, Jun. 23, 2016, 14 pages.
"Notice of Allowance", U.S. Appl. No. 13/726,043, May 4, 2016, 15 pages.
"Notice of Allowance", U.S. Appl. No. 13/726,048, Mar. 28, 2016, 8 pages.
"Notice of Allowance", U.S. Appl. No. 13/726,049, Jun. 9, 2016, 8 pages.
"Summons to Attend Oral Proceedings", EP Application No. 12859485.0, May 4, 2016, 8 pages.
"Final Office Action", U.S. Appl. No. 12/897,586, May 22, 2013, 4 pages.
"Foreign Office Action", CL Application No. 201300886, May 13, 2015, 7 pages.
"Foreign Office Action", CN Application 201110317851.5, May 20, 2015, 8 pages.
"Foreign Office Action", EP Application No. 12859600.4, Jun. 1, 2015, 8 Pages.
"Foreign Office Action", EP Application No. 12860373.5, Jul. 7, 2015, 6 pages.
"Foreign Office Action", JP Application No. 2013-532806, Jun. 10, 2015, 11 pages.
"Non-Final Office Action", U.S. Appl. No. 12/897,586, Oct. 18, 2012, 12 pages.
"Non-Final Office Action", U.S. Appl. No. 13/726,049, Jul. 7, 2015, 14 pages.
"Non-Final Office Action", U.S. Appl. No. 13/726,090, Jun. 23, 2015, 31 pages.
"Non-Final Office Action", U.S. Appl. No. 14/495,418, Jul. 2, 2015, 18 pages.
"Supplementary European Search Report", EP Application No. 12860373.5, Jun. 25, 2015, 3 pages.
"Final Office Action", U.S. Appl. No. 13/726,090, Dec. 16, 2016, 24 pages.
"Final Office Action", U.S. Appl. No. 13/726,099, Dec. 22, 2016, 13 pages.
"Foreign Office Action", JP Application No. 2014-548998, Dec. 13, 2016, 10 pages.
"Non-Final Office Action", U.S. Appl. No. 15/143,731, Dec. 7, 2016, 9 pages.
"Notice of Allowance", U.S. Appl. No. 13/726,092, Dec. 18, 2015, 5 pages.
"Final Office Action", U.S. Appl. No. 14/746,763, filed Jan. 17, 2017, 11 pages.
"Foreign Office Action", CN Application No. 201280063918.X, Mar. 20, 2017, 13 pages.
"Notice of Allowance", U.S. Appl. No. 13/726,043, filed Mar. 17, 2017, 15 pages.
"Foreign Office Action", CN Application No. 20128004066.6, Sep. 29, 2016, 6 pages.
"Foreign Office Action", CN Application No. 201380038072.9, Aug. 25, 2016, 9 pages.
"International Preliminary Report on Patentability", Application No. PCT/US2012/071555, Jul. 3, 2014, 5 pages.
"Non-Final Office Action", U.S. Appl. No. 13/090,474, filed Apr. 8, 2015, 11 pages.
"Non-Final Office Action", U.S. Appl. No. 13/090,474, filed Dec. 3, 2015, 14 pages.
"Notice of Allowance", U.S. Appl. No. 13/726,092, filed Dec. 18, 2015, 5 pages.

* cited by examiner

RESTRICTED EXECUTION MODES

RELATED APPLICATIONS

This application is a continuation of U.S. patent application Ser. No. 13/726,099 filed Dec. 22, 2012 entitled "Restricted Execution Modes," which claims priority under 35 U.S.C. Section 119(e) to U.S. Provisional Application Ser. No. 61/580,147 filed Dec. 23, 2011 entitled "Mobile Device Shared", the disclosures of which are incorporated by reference herein in its entirety. This application also claims priority under 35 U.S.C. Section 119(e) to U.S. Provisional Application Ser. No. 61/695,294 filed Aug. 30, 2012 entitled "Mobile Device Kid Space", the disclosure of which is incorporated by reference herein in its entirety.

BACKGROUND

Many types of devices, such as mobile phones, tablet devices, and other computing, communication, and entertainment devices increasingly offer more functions, applications, and features which are beneficial to a user, and can enhance one's personal time as well as work and social activities. For example, not only can a mobile phone be used for text, email, and voice communications, but may also be used for entertainment, such as to listen to music, surf the Internet, watch video content, gaming, and for photo and video imaging. Similarly, a portable tablet device may be utilized for email, browser, navigation, and other computing applications, as well as for the various entertainment and photo features. In addition to the many computing, communication, and entertainment applications that are available to a user of a mobile phone or tablet device, a seemingly unlimited number of third-party applications and features are also available for download to a device.

Parents of younger children that do not yet have their own mobile phones often find that a child wants to "play" with their phone to play games, take pictures, listen to music, and other activities. Typically, a parent may pass his or her phone to a young child in the back seat of the car while driving to keep the child entertained. The parent may not know then what features and applications the child access on the device, such as a Web browser or unintentionally accessing an email application, or which device settings may have been changed, such as audio settings, alarm settings, calendar notices, and the like.

SUMMARY

This Summary introduces features and simplified concepts of restricted execution modes, which are further described below in the Detailed Description and/or shown in the Figures. This Summary should not be considered to describe essential features of the claimed subject matter, nor used to determine or limit the scope of the claimed subject matter.

Restricted execution modes is described. In embodiments, a mobile device can display a device lock screen on an integrated display device, and transition from the device lock screen to display a shared space user interface of a shared space. The transition to display the shared space user interface happens without receiving a PIN code or other authentication credential entered on the device lock screen. The mobile device implements a restricted execution service that is implemented to activate a restricted execution mode of the mobile device, and restrict access of a device application to device content while the restricted execution mode is activated. The restricted execution service can also allow a shared device application that is included in the shared space access to the device content while the restricted execution mode is activated.

In embodiments, the restricted execution service restricts device application access to the device content via the shared device application while the restricted execution mode is activated when the device application calls the shared device application with a request for the device content. Alternatively, the restricted execution service can allow the device application access to the device content via the shared device application while the restricted execution mode is activated based on a request token that the device application includes in a task call to the shared device application for the device content. The request token indicates that the device application is permitted to access the device content via the shared device application in the shared space.

In embodiments, a device application may be implemented or designed so that a user can designate to allow the device application access to the device content if the device application is included in the shared space as a shared device application. Alternatively, a device application may be designed as not to be allowed access to the device content even if the device application is included in the shared space. Additionally, this type of a device application may also be implemented as not even being eligible for user-designation to be included in the shared space. A device application that is included in the shared space can initiate a task call to access the device content. However, the restricted execution service restricts access to the device content based on one or more of the device application tasks being designated as restricted while the restricted execution mode is activated. The restricted execution service can also restrict the device application from a file system of the mobile device while the restricted execution mode is activated.

BRIEF DESCRIPTION OF THE DRAWINGS

Embodiments of restricted execution modes are described with reference to the following Figures. The same numbers may be used throughout to reference like features and components that are shown in the Figures.

DETAILED DESCRIPTION

Figure 1:
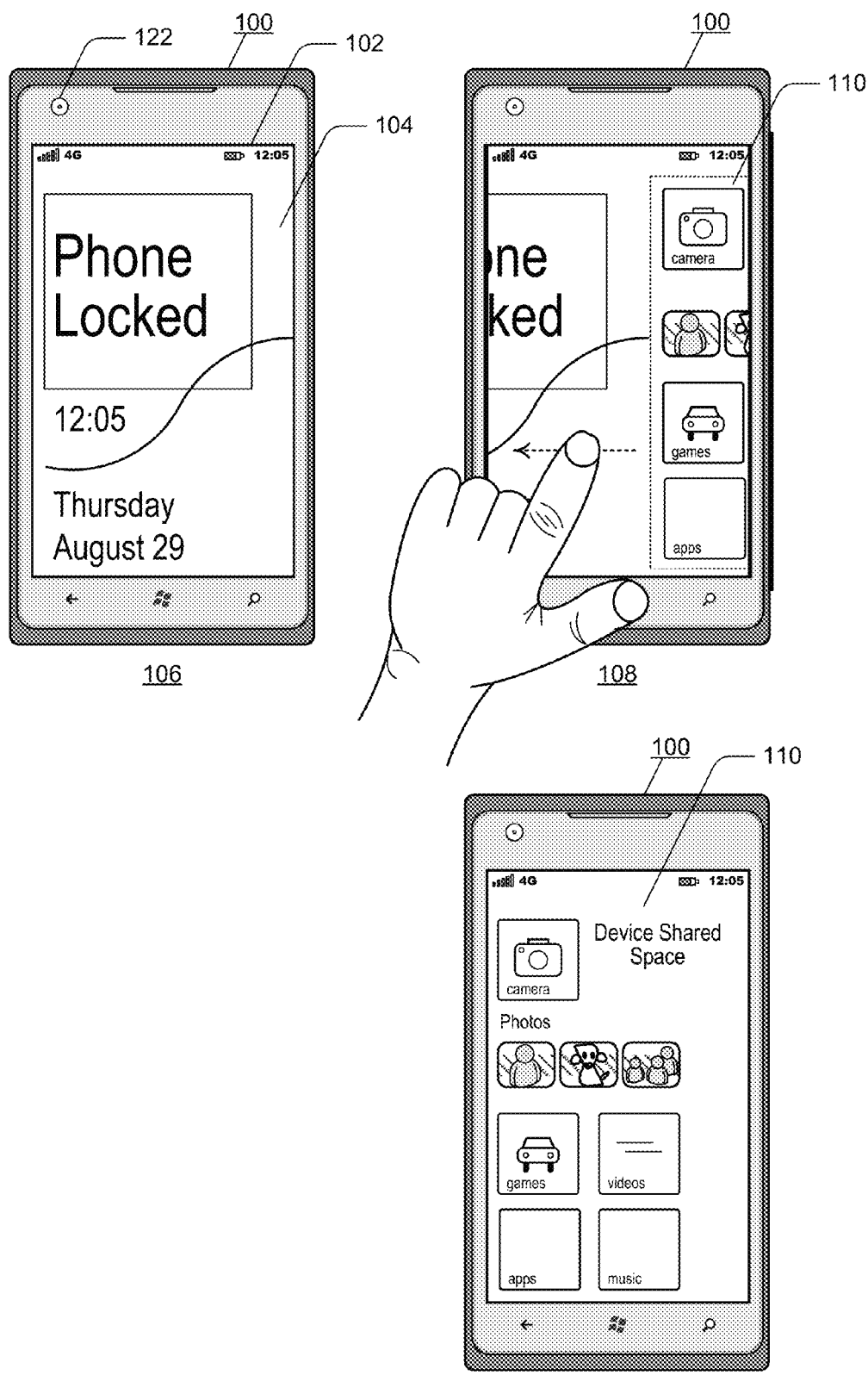
FIG. 1 illustrates an example of restricted execution modes.

Embodiments of restricted execution modes are described and provide a restricted execution service that can be implemented as a client device service or application, such as in a mobile phone, portable tablet device, or other type of computing and/or communication device. Restricted execution modes enable implementation of a shared space on a device where a user owner can include device applications that a guest or child can access without requiring a password, and the device applications will be programmatically prevented from being able to access other private device content on the device.

There may be situations when a user owner of a device may want to have access to some content or applications on their mobile phone without unlocking the phone with a PIN code or other authentication credential. Restricted execution modes enable the user owner to make some experiences available without password access, and without compromising the security of sensitive personal or corporate data. In implementations, restricted execution modes allow applications to run, but restricts access to sensitive data or experiences using several mechanisms, such as security capabilities, blocked navigation, and application origin. If an application has a particular security capability, a runtime check is made centrally when the application attempts to access a protected resource, and if the application is running in a restricted execution zone, an error is returned that can be handled by the application. When a device is running in a restricted execution mode, a device application may be referred to as running in a restricted execution "zone".

For the blocked navigation security capability, applications often take advantage of built in tasks to complete user actions like sending an email, making a phone call, etc. When the restricted execution mode is activated on a device, the origination of a device application task at run-time is what is considered to determine whether the device application, and more specifically, whether the task will be allowed. An application task, which is generally synonymous to an application programming interface (or API) call, may include aspects of a data access API call, but it also includes a request to initiate a particular action or actions different than data access, and the task request may incorporate metadata associated with the action of the requested task. The level of functionality is provided on a task-by-task basis to determine whether the action or actions of a requested task will be available in the restricted execution mode during run-time origination of a task request. A device application can be executed by the device, but only some functions of the device application will execute when the restricted execution mode is activated on the device.

Examples of restricting the functionality of a device application may include not permitting the device application to be launched altogether or limiting the device application to calling only a restricted subset of API calls that is narrower than the normal set of API calls available to the application when the mobile device is running in normal user mode. Restricting access to device content also may include disallowing certain API calls that provide access to particular sets of data or content. In many examples, restricting functionality or access does not include analyzing or changing Access Control Lists (ACLs), Access Control Entries (ACEs), or similar file-system access control metadata maintained by a file system. For example, a device application can be restricted from access to device content while a restricted execution mode is activated on a device.

When running in a restricted execution zone, all application requested navigations are screened and only those allowed by the system can continue. Others fail in a backwards compatible way so that legacy applications do not need to be updated to run in the restricted execution zone.

For the application origin security capability, only applications that originate and/or have been downloaded from a first-party provider can run (e.g., execute) in a restricted execution mode. This ensures that applications which have not been security checked, and may access sensitive and/or private data on a device, do not run without the user unlocking the device first.

While features and concepts of restricted execution modes can be implemented in any number of different devices, systems, environments, and/or configurations, embodiments of restricted execution modes are described in the context of the following example devices, systems, and methods.

FIG. 1 illustrates an example of user interfaces of a restricted execution mode. An example mobile device 100 may be any one or combination of a mobile phone, tablet device, computing device, communication, entertainment, gaming, navigation, and/or other type of portable electronic device. A shared space can be implemented for user access to functionality of device applications without a password, as well as for access to any applications, functions, and features of the mobile device 100 that are designated by the user in the shared space.

The example mobile device 100 includes an integrated display device 102 on which user interfaces can be displayed, such as a device lock screen 104 that indicates the device is locked at 106. For example, a user owner of the mobile device may set-up the device to lock when not in use so that someone else cannot access the full functionality of applications, such as email and text, and/or have access to the Internet via a browser application without providing authentication credentials such as a personal identification number (PIN), login, or other authentication credential.

The user owner of the mobile device 100 can allow another person to use the phone, and hand the phone over without having to unlock the device from the device lock screen 104 by entering a PIN or other credential. As shown in the example 108, a person that has borrowed the phone can swipe the device lock screen with a gesture input to access a shared space user interface 110, which is illustrated at 112 when displayed on the display device, and which provides access to a limited subset of application functionality. The borrower does not enter a PIN or other credential to access the shared space user interface. In implementations, the gesture input may be any type of user and/or gesture input in any direction on the integrated display device 102 of the mobile device. Alternatively or in addition, any type of device, button, and/or gesture inputs may be utilized effective to transition from the device lock screen 104 to the shared space user interface 110.

Figure 2:
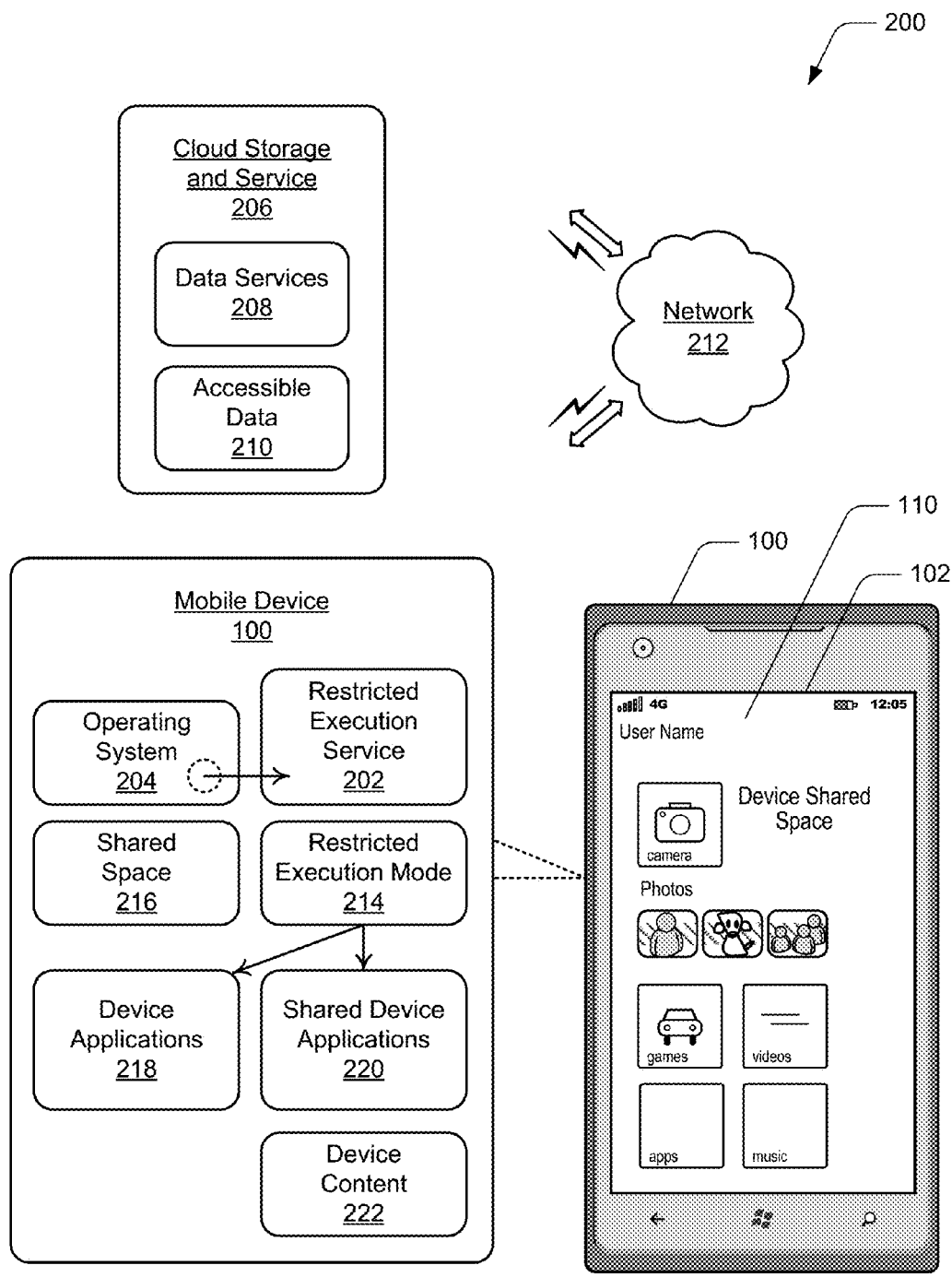
FIG. 2 illustrates an example system in which embodiments of restricted execution modes can be implemented.

FIG. 2 illustrates an example system 200 in which embodiments of restricted execution modes can be implemented. The example system includes the mobile device 100 as described with reference to FIG. 1, with the integrated display device 102 on which a user interface can be displayed, such as the shared space user interface 110 that is representative of a shared space on the device. Additionally, the mobile device can be implemented with various components, such as a processor and/or memory system, as well as any number and combination of differing components as further described with reference to the example device shown in FIG. 10 to implement embodiments of restricted execution modes.

The mobile device 100 includes a restricted execution service 202 that can be implemented as a software application (e.g., executable instructions) stored on computer-readable storage media, such as any suitable memory device or electronic data storage. Additionally, the restricted execution service 202 can be executed with a processing system at the mobile device to implement embodiments of restricted execution modes as described herein. The restricted execution service 202 may be implemented as an independent device application that is executable on the device to interface with the many applications, features, and functions of the device.

The example system 200 may also include a cloud storage and service 206 that can include any type of cloud-based (e.g., network-based) data services 208 used to store or maintain accessible data 210 (e.g., data accessible by device applications on the mobile device 100). Any of the devices and services (e.g., implemented as server devices) described herein can communicate via a network 212, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider. Alternatively or in addition, peer-to-peer communication techniques may be utilized, such as multiple devices connected using a peer-to-peer communication network.

The restricted execution service 202 is implemented to manage a restricted execution mode 214 of a shared space 216, such as to limit and/or restrict device applications 218 and shared device applications 220 that are included in the shared space 216 that is accessible without a PIN or authentication credential. The device applications 218 can include any type of software applications, and the functions and features thereof, that run on the device, such as for user interaction with messaging, gaming, media playback, document viewing, and communication applications. The device applications may also include system-level components that users of a device generally do not access or utilize, but that typically run in the background while the device is operational. The shared device applications can include any subset of the device applications, and are designated as a shared device application when included in the shared space 216 for limited and/or restricted functionality when a restricted execution mode 214 is activated on the device.

A user owner of the mobile device 100 can choose the device applications and features, and/or device content, that can be included in the shared space and accessed by a child or guest while the restricted execution mode is activated. Further, a device application may be allowed a restricted level of functionality while running in the shared space (i.e., the application may be executed), yet generally cannot access device content 222 that is restricted from access, such as contacts, email, and calendar databases, as well as limited access to the device file system.

The content databases, device file system, Internet access, and other device content and features can be protected from device application access when the restricted execution mode is activated. For example, a device application that can access the Internet, email, contacts, etc. when a device is unlocked and operating in a normal user mode will be automatically restricted when the restricted execution mode is activated, such as if the device application has been added to the shared space and is allowed limited functionality in the shared space. As an example, a digital camera application that has been added to the shared space may allow a user to take and view new photos, but previous photos will be restricted from viewing the restricted execution mode is activated on the device.

The shared space user interface 110 of the shared space is customizable by the user owner of the device. For example, the user owner can add applications, such as games and music applications, to the shared space so that the applications are recognized and can be launched in the shared space, perhaps with limited functionality. However applications that are not recognized in the shared space cannot be launched in the shared space. For example, if a game application that is pinned or recognized in the shared space attempts to itself launch a browser application (e.g., as part of the game's execution), the restricted execution service 202 will check if the browser application is pinned and recognized in the shared space. If the browser application is not recognized in the shared space, then the restricted execution service will fail to launch the application, or if the browser application is recognized, then the browser application can be launched in the shared space by the game application.

As described with reference to FIG. 1, an input can be received, such as a gesture input or device selectable control input, and the restricted execution service 202 initiates a transition from displaying the device lock screen 104 to display the shared space user interface 110 of the shared space 216 without receiving a PIN code or other authentication credential entered on the device lock screen. The restricted execution service 202 is implemented to manage the shared space 216 when the restricted execution mode 214 is activated. The restricted execution service 202 can activate the restricted execution mode 214 of the mobile device 100, and restrict access of a device application 218 to the device content 222, to a file system of the mobile device, and/or to limit the application to a limited set of functionality or tasks while the restricted execution mode is activated.

The shared space 216 can include a shared device application 220, and the restricted execution service 202 can allow the shared device application access to the device content 222 while the restricted execution mode 214 is activated. The restricted execution service 202 can determine whether a device application 218 is implemented or designed so that a user can designate to allow the device application access to the device content if the device application is included in the shared space 216 as a shared device application. Alternatively, a device application may be designed as not to be allowed access to the device content even if the device application is included in the shared space. Additionally, this type of a device application may also be implemented as not even being eligible for user-designation to be included in the shared space.

In restricted modes, a configuration of a device application may be designed or programmed to indicate whether the device application is ever to be allowed to run (e.g., execute) in a restricted mode, irrespective of user choice. For example, a confidential corporate application or another application downloaded from a third-party application store that may access private corporate data can be configured to never be allowed to run (e.g., execute) in any restricted mode, even if a user would like it to do so. A configuration of some device applications may be user-controlled to indicate whether the device application is to be allowed to run in a particular restricted mode, such as allowing a subset of games or applications in a kid zone restricted mode, or allowing a subset of camera lens applications to run when the phone is locked.

The restricted execution service 202 can also be implemented to validate whether or not a given device application can be navigated to regardless of the reason for the navigation request, taking into account the current restricted mode and the target application's system and user configuration. Additionally, a separate navigation stack can be maintained for a normal mode user experience and for the current restricted execution mode. The restricted execution service 202 is also implemented to allow or disallow migration of applications from the normal mode stack to the restricted mode stack or vice-versa based on scenario needs, and to determine when to close applications on each stack based on available resources and transitions into and out of a restricted mode.

A device application 218 may initiate a task call to a shared device application 220 with a request for the device content 222, and the restricted execution service 202 can restrict the device application access to the device content via the shared device application while the restricted execution mode 214 is activated. The device application may also initiate a task call to the operating system 204 to request device content access, and the restricted execution service can restrict the access to the device content based on one or more device application tasks being designated as restricted while the restricted execution mode is activated.

Alternatively, the device application 218 can initiate a task call to the shared device application 220 with a request for the device content 222, and the request includes a request token that indicates the device application is permitted to access the device content via the shared device application in the shared space 216. The restricted execution service 202 can then allow the device application access to the device content via the shared device application based on the request token while the restricted execution mode is activated. The restricted execution service can also deactivate the restricted execution mode 214 responsive to a PIN code or authentication credential entered on the device lock screen, and return to a normal user mode of the mobile device in which the device application 218 has unrestricted access to the device content 222.

The restricted execution service 200 implements a mechanism to indicate in which restricted modes a device application can run (e.g., execute) based on a task information field of a device application task. The task information field indicates whether a specific task can be allowed to execute in a shared space when the restricted execution mode is activated. This new field will be a bit mask, which a navigation server will use to compare to the navigation filter mask that MobileUI will give to it when a restricted mode is entered. These are marked per task instead of by application because some first-party device applications have tasks that can be allowed to function in a child share space (e.g., Kid's Corner), but not all of the application functionality is allowed while a restricted execution mode is activated on a device. If a device application is allowed to run in a shared space, the restricted execution service can trace an API task call through the application layer from an originator (e.g., device application) that initiates the task call based on a token that is passed along to a core system component that would not otherwise be able to determine whether the task call was originated from a device application running in the shared space. The token can be utilized to determine if the task call is protected from a restricted execution mode.

Example methods 300, 400, and 500 are described with reference to respective FIGS. 3-5 in accordance with one or more embodiments of restricted execution modes. Generally, any of the services, components, modules, methods, and operations described herein can be implemented using software, firmware, hardware (e.g., fixed logic circuitry), manual processing, or any combination thereof. Example methods may be described in the general context of executable instructions stored on computer-readable storage media that is local and/or remote to a computer processing system, and implementations can include software applications, programs, functions, and the like.

Figure 3:
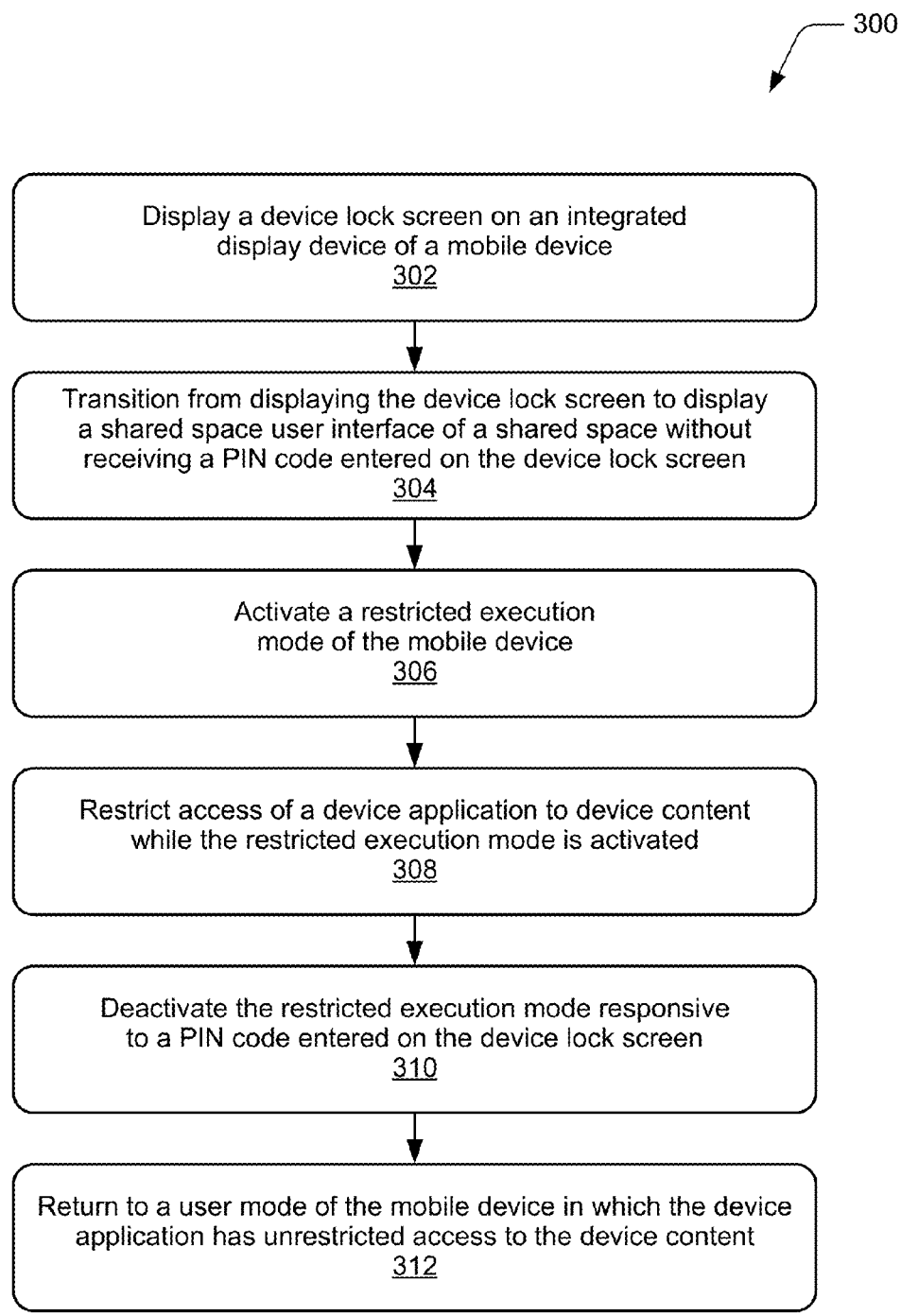
FIG. 3 illustrates example method(s) of restricted execution modes in accordance with one or more embodiments.

FIG. 3 illustrates example method(s) 300 of restricted execution modes. The order in which the method is described is not intended to be construed as a limitation, and any number or combination of the method operations can be combined in any order to implement a method, or an alternate method.

At 302, a device lock screen is displayed on an integrated display device of a mobile device. For example, the mobile device 100 (FIG. 1) displays a device lock screen 104 on the integrated display device 102 of the mobile device. At 304, the display is transitioned from the device lock screen to display a shared space user interface of a shared space without a PIN code or other authentication credential entered on the device lock screen. For example, an input system of the mobile device 100 receives an input, such as a gesture input or device selectable control input, and the input is effective to transition from displaying the device lock screen 104 to display the shared space user interface 110 of a shared space 216 without a PIN code or other authentication credential entered on the device lock screen.

At 306, a restricted execution mode of the mobile device is activated. For example, the restricted execution service 202 at the mobile device 100 activates the restricted execution mode 214 of the mobile device in response to entering the shared space. At 308, access of a device application to device content is restricted while the restricted execution mode is activated. For example, the restricted execution service 202 at the mobile device 100 restricts access of a device application 218 to the device content 222 while the restricted execution mode 214 is activated.

At 310, the restricted execution mode is deactivated responsive to a PIN code or other authentication credential entered on the device lock screen. For example, the restricted execution service 202 at the mobile device 100 deactivates the restricted execution mode responsive to a PIN code or other authentication credential entered on the device lock screen. At 312, the device returns to a user mode of the mobile device in which the device application has unrestricted access to the device content. For example, the restricted execution service 202 at the mobile device 100 returns to a user mode of the mobile device in which the device application 218 has unrestricted access to the device content 222.

Figure 4:
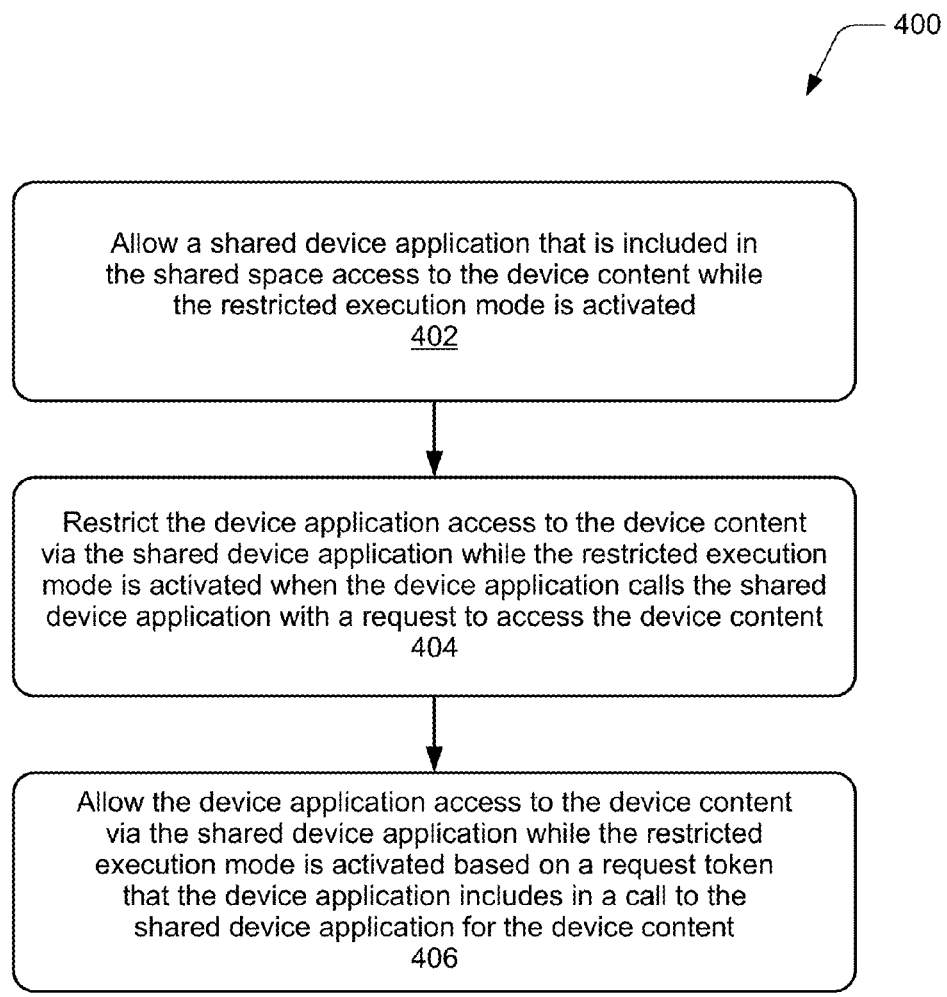
FIG. 4 illustrates example method(s) of restricted execution modes in accordance with one or more embodiments.

FIG. 4 illustrates example method(s) 400 of restricted execution mode. The order in which the method is described is not intended to be construed as a limitation, and any number or combination of the method operations can be combined in any order to implement a method, or an alternate method.

At 402, a shared device application that is included in the shared space is allowed access to the device content while the restricted execution mode is activated. For example, the restricted execution service 202 (FIG. 2) at the mobile device 100 allows access to the device content 222 to a shared device application 220 that is included in the shared space 216 while the restricted execution mode is activated.

At 404, the device application that requests access to the device content via the shared device application is restricted while the restricted execution mode is activated on the device. For example, restricted execution service 202 at the mobile device 100 restricts a device application 218 task call to the shared device application 220 with a request to access the device content 222 while the restricted execution mode is activated on the device.

At 406, the device application is allowed access to the device content via the shared device application while the restricted execution mode is activated based on a request token that the device application includes in a task call to the shared device application for the device content. For example, restricted execution service 202 at the mobile device 100 allows access to the device content 222 by the device application 218 via the shared device application while the restricted execution mode is activated based on a request token that the device application includes in a task call to the shared device application for the device content. The request token indicates that the device application is permitted to access the device content via the shared device application in the shared space.

Figure 5:
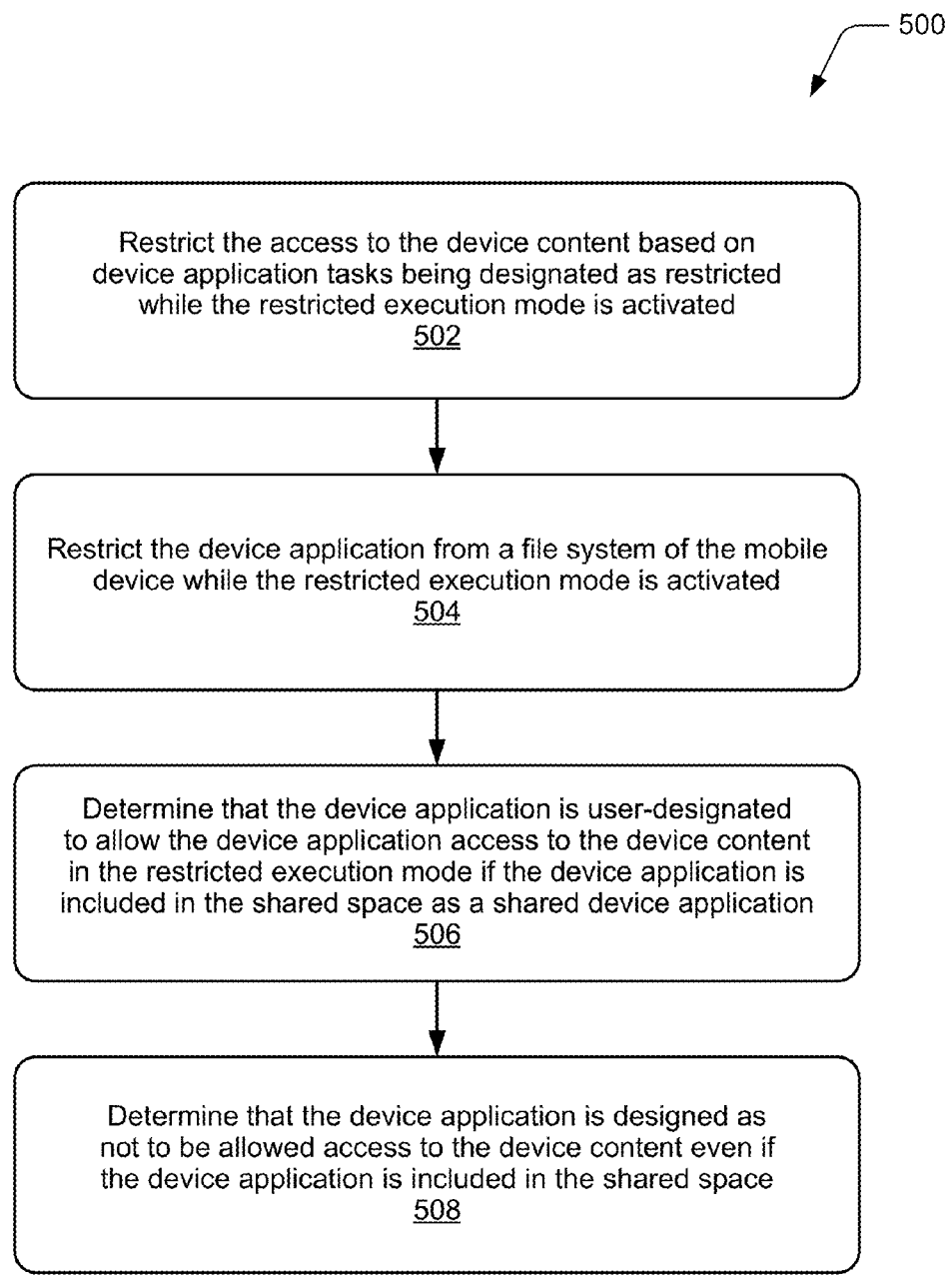
FIG. 5 illustrates example method(s) of restricted execution modes in accordance with one or more embodiments.

FIG. 5 illustrates example method(s) 500 of restricted execution modes. The order in which the method is described is not intended to be construed as a limitation, and any number or combination of the method operations can be combined in any order to implement a method, or an alternate method.

At 502, access to the device content is restricted based on device application tasks being designated as restricted while the restricted execution mode is activated, where the device application initiates a task call to access the device content. For example, restricted execution service 202 (FIG. 2) at the mobile device 100 restricts access to the device content 222 based on device application tasks being designated as restricted while the restricted execution mode 214 is activated, where a device application 218 initiates task calls to access the device content.

At 504, the device application is restricted from a file system of the mobile device while the restricted execution mode is activated. For example, restricted execution service 202 at the mobile device 100 restricts a device application 218 from a file system of the mobile device while the restricted execution mode is activated.

At 506, the device application is determined as user-designated to allow the device application access to the device content in a restricted execution mode if the device application is included in the shared space as a shared device application. Alternatively, at 508, the device application is determined as designed as not to be allowed access to the device content even if the device application is included in the shared space. For example, restricted execution service 202 at the mobile device 100 can determine whether a device application user-designated to allow the device application access to the device content in a restricted execution mode if the device application is included in the shared space as a shared device application. The restricted execution service 202 may also determine that a device application is designed (e.g., programmed) as not to be allowed access to the device content even if the device application is included in the shared space. Additionally, this type of a programmed device application may also be implemented as not even being eligible for user-designation to be included in the shared space.

Although described herein as a single restricted execution mode, in some examples, a device provides multiple restricted execution modes, such as a first restricted execution mode associated with a child shared space for facilitating sharing a mobile device with a child and a second restricted execution mode associated with a safe driving shared space for facilitating safer driving by a user of a mobile device. These various restricted execution modes may each impose a different set of limitations on the functionality of the device. For example, the child-related execution mode might block access to email data, changes to device settings, or in-app purchases, while the second driving safety restricted execution zone might block graphical user interfaces that could distract a driver from the road.

From the lock screen displayed on a device, without entering a PIN or other authentication credentials, a user may be able to reach different shared spaces, each of which has a different restricted execution mode associated with it. For example, from the lock screen, a user might enter a first gesture (e.g., a left swipe) to reach a first shared space having a first restricted execution mode and a second different gesture (e.g., a right swipe) to reach a second, different shared space having a second restricted execution mode. In some examples, a shared space associated with a restricted execution mode may be accessed from different entry points than receiving an input (e.g., a gesture input) on the lock screen.

The features and concepts described herein for restricted execution modes may be utilized to support and implement one or more restricted execution modes associated with a child shared space of a device for facilitating sharing the device with a child. This Restricted Execution Modes application incorporates a related U.S. patent application Ser. No. 13/726,095 filed Dec. 22, 2012 entitled "Mobile Device Child Share", the disclosure of which is incorporated by reference herein in its entirety. Mobile device child share enables implementation of a "Kid's Corner" (also referred to as a kid space or child zone) for parental control of any applications, data, functions, and features of a mobile device so that a parent can allow a child to play with the device without having access to the restricted applications, data, functions, and features. Kid's Corner is a child shared space that provides a custom destination on a mobile phone just for a child, and where the child goes to "play" on the device. In a child share space, child access is restricted with a restricted execution mode to only the applications, games, music, videos, movies and other content that a parent chooses. All of the settings and content outside of the Kid's Corner is protected and purchases can be blocked while in the Kid's Corner. The blocked and/or restricted applications and features of a mobile device may include the ability to make a phone call, send a text or access email, and access the Internet, such as to post to social networks or to search the Internet.

The features and concepts described herein for restricted execution modes may be utilized to support and implement one or more restricted execution modes associated with a safe driving shared space of a device for facilitating safe driving modes. This Restricted Execution Modes application incorporates a related U.S. patent application Ser. No. 13/726,097 filed Dec. 22, 2012 entitled "Mobile Device Safe Driving", the disclosure of which is incorporated by reference herein in its entirety. Mobile device safe driving enables implementation of one or more safe driving modes to minimize driver distractions of a mobile phone while driving a vehicle.

Figure 6:
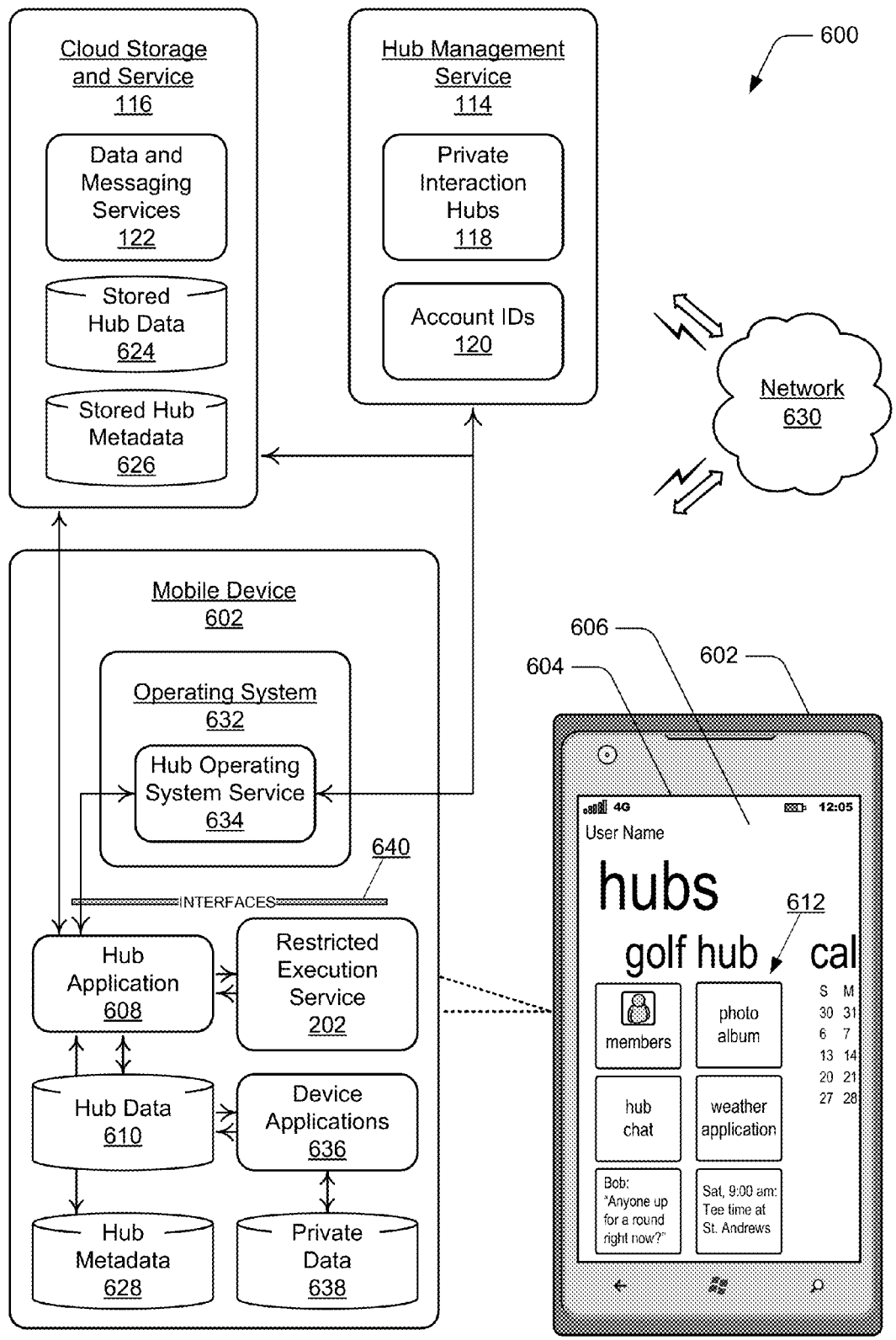
FIG. 6 illustrates an example system in which embodiments of private interaction hubs can be implemented.

FIG. 6 illustrates an example system 600 in which embodiments of private interaction hubs and restricted access modes can be implemented. The system 600 includes an example mobile device 602, which may be any one or combination of a wired or wireless device, such as a mobile phone, tablet, computing, communication, entertainment, gaming, media playback, and/or other type of device. Any of the devices can be implemented with various components, such as a processing system and memory, as well as any number and combination of differing components as further described with reference to the example device shown in FIG. 10. As such, the mobile device 602 may implement techniques previously described in whole in or part, such as the techniques described with reference to the restricted execution service 202.

The mobile device 602 includes an integrated display device 604 on which user interfaces can be displayed, such as a hub user interface 606 of a hub application 608. The hub user interface offers a unified interactive view of the hub data 610 for a single, private interaction hub and the hub application 608 aggregates disparate types of the hub data 610 originating from the various member users of the private interaction hub. For example, the hub user interface may provide a single unified access point to shared hub messages, status updates, check-ins, hub calendar events, hub media, hub applications, and other types of hub content. As described above, a private interaction hub (or simply "hub") is a private network or association of member users who voluntarily elect to privately interact and collaborate with each other in a bi-directional manner. The hub data 610 includes any shared data or metadata that is used to facilitate the interaction and collaboration between the members of a private interaction hub, and may include shared data for messaging, notes, contact management, documents, tasks, location updates, photos, calendar events, applications (to include collaborative gaming applications), and/or other media content, such as any type of audio, music, video, and/or image data that may be available or accessed from any source.

The basic functionality of an example private interaction hub is shown as a golf hub displayed in the hub user interface 606 of the hub application 608. For example, the hub user interface can include various selectable user interface tiles 612, such as a members tile that is selectable to initiate a display of the constituent members of the private interaction hub. The user interface tiles 612 may also include hub chat and/or messages tiles to allow a hub member to participate in shared messaging threads with the other member users of the hub. For example, as shown, the member "Bob" has asked "Anyone up for a round right now?" The user interface tiles 612 may also include a photo album tile that is selectable to view photos shared by any of the hub members with the hub, and a shared notebook tile from which the hub members can view shared notes. For example, the golf hub may include a shared notes document that compiles the hub members' collective research of new golf equipment. The hub user interface 606 may also display a shared calendar that allows a member of the hub to view, edit, and post calendar events that will be shared with all of the other hub members. For example, the calendar tile shows an upcoming tee time at St. Andrews on Saturday at 9:00 a.m. for all of the members. When a user selects a group item (e.g., the message from Bob) or tile (e.g., the messaging tile), further details about the selected item or group items related to the selected tile may be displayed by the hub application itself or the hub application may call a different device application 636 (e.g., a messaging application) to display further details about the item(s).

When a user selects or otherwise engages with a piece of displayed hub data, such as the golf message from Bob, the hub application may provide additional details or options to the user to permit the user to interact further with the hub data. For example, the hub application may display controls to allow the user to edit or reply to Bob's message. Alternatively or in addition, when a user selects or otherwise engages with a piece of displayed hub data (e.g., Bob's message), the hub application may launch or call another device application to permit the user to further interact with the piece of hub data (e.g., the hub application may call a native messaging application).

The hub user interface 606 of the hub application 608 can also include user-selectable access to third-party applications, such as when an application is "pinned" to, or otherwise shared with a private interaction hub. A pinned third-party application may also utilize the shared hub data, such as shared application preferences or shared application state data. For example, the golf hub shown displayed in the hub user interface 606 includes a live tile representing a third-party weather application that the members of the hub can quickly access to check the weather forecast at their local golf club, such as when planning an upcoming golf outing. A user of the mobile device 602 can also customize display aspects of a hub user interface, such as the content of the user interface and how the elements of the hub user interface are arranged. Another example of a hub user interface of the hub application 608 is a panoramic hub user interface, such as for a family-centric private interaction hub as shown and described in greater detail with reference to FIG. 9.

The example system 600 also includes a hub management service 614, and a cloud storage and service 616. The hub management service 614 manages the formation and maintenance of private interaction hubs 618. The hub management service can correlate or associate member users of a hub by associating account identifiers 620 of the members with one or more of the private interaction hubs. The account identifier 620 of a member user may be associated with an identifier of a private interaction hub 618 in a data table that the hub management service maintains to correlate the hub members with one or more of the private interaction hubs. The hub management service 614 may also associate devices that correspond to hub members based on device identifiers. The account identifiers 620 can include user membership identifiers and/or sign-on credentials, such as an email and password combination, or a username and password combination. The sign-on credentials may be single sign-on ("SSO") credentials that are utilized for authentication purposes at a number of Web services, including the cloud storage and service 616.

The cloud storage and service 616 can include any type of cloud-based (e.g., network-based) data and messaging services 622. The messaging services may include any type of email, text (e.g., SMS, MMS), and/or instant messaging services. The data services may include any type of calendar, photo album, file or document sharing, location, mapping, music sharing, video sharing, gaming, contacts management, and/or notebook services, as well as any other type of services that can be used to share stored hub data 624. The stored hub data can include any form of messages, updates, events, content, media, and information that is maintained for the private interaction hubs 618, and is accessible from the mobile device 602, either upon a request from a device and/or upon a data "push" to the device. The cloud storage and service 616 also maintains stored hub metadata 626 that includes settings and information pertaining to the private interaction hubs 618, such as the name of a hub, the background image or photo of the hub, and an association of the hub members.

Although shown together as data and messaging services 622, various application data services and various messaging services may be operated on separate devices and/or operated by separate, distinct entities. Additionally, although the hub management service 614 and the cloud storage and service 616 are shown as independent services, they may be implemented together as a single service. Further, a server device (or group of server devices) can include implementations of both the hub management service 614 and the cloud storage and service 616, representative of a single entity that may be the same server system, company system, domain, and the like.

The cloud storage and service 616, and its constituent data and messaging services 622, interchange the stored hub data 624 and the stored hub metadata 626 between the mobile devices that are associated with member users of a private interaction hub 618. For example, a data and/or messaging service of the cloud storage and service 616 can receive a copy of hub data 610 and/or hub metadata 628 from the mobile device 602 that is used by a hub member, store this hub data and hub metadata in the cloud storage as the respective stored hub data 624 and stored hub metadata 626, and then distribute the stored hub data and stored hub metadata to other mobile devices associated with other member users of the same private interaction hub, as well as to other mobile devices associated with the same hub member. The stored hub metadata 626 can include membership information pertaining to the member users of a private interaction hub, hub identifiers that correlate a piece of hub data to a particular private interaction hub, user identifiers that correlate a piece of hub data to a particular member user, modification dates, and/or other metadata.

The cloud storage and service 616, and its constituent data and messaging services 622, may utilize single sign-on ("SSO") credentials for authentication purposes to limit the dissemination of the stored hub data 624 and the stored hub metadata 626 to only the authorized devices of hub members. Additionally, any of the devices and services (e.g., implemented as server devices) described herein can communicate via a network 630, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The mobile device 602 includes an operating system 632 of the device, and the operating system includes a hub operating system service 634 that is implemented to integrate cloud-based services, a hub application 608, and local device applications 636 with the operating system to implement aspects of the private interaction hubs 618. The aspects that may be implemented include hub formation and membership maintenance, synchronizing the hub data 610 on the mobile device with the stored hub data 624, as well as the hub metadata 628 with the stored hub metadata 626, with the cloud storage and service 616, and providing the hub application 608 and the local device applications 636 on the mobile device 602 with access to the hub data 610 and the hub metadata 628. For example, the hub operating system service 634 may directly access the stored hub metadata 626 at the cloud storage and service 616.

The hub operating system service 634 (or alternatively, the hub application 608) may also determine and maintain a local copy of the membership associations of member users account identifiers 620 and identifiers of the private interaction hubs. The hub operating system service 634 may also synchronize the stored hub data 624 from the cloud storage and service 616 with the hub data 610 at the mobile device 602, and synchronize the stored hub metadata 626 from the cloud storage and service with the hub metadata 628 at the mobile device. The hub operating system service 634 may also synchronize with the cloud storage and service 616 (e.g., by sending changes or additions to hub data 610 and hub metadata 628 to the cloud storage and service 616). Such data synchronizations may occur in response to a user launching the hub application.

The mobile device 602 includes the device applications 636 that permit a user of the mobile device to access, create, and/or modify the hub data 610, private data 638 of the user, as well as the stored hub data 624 that is managed by any of the data and messaging services 622 at the cloud storage and service 616. Some or all of the device applications 636 may be implemented as client-side components or modules of any of the data and messaging services 622, or may be implemented as standalone, native applications (e.g., local device applications) at the mobile device. The device applications 636 typically each consume and provide access to only a portion or subset of the hub data 610 and the private data 638, such as only a single type of hub data and private data (e.g., only messaging data, but not calendar data). The device applications also typically present the consumed hub data to a user in conjunction with the private data 638. Private data is data or metadata that is not associated with a private interaction hub and that has not been shared with other members of the hub (e.g., data that has not been shared via the cloud storage and service 616).

The device applications 636 at the mobile device 602 may include a native or third-party messaging application that provides a user with messaging alerts and access to messaging threads. The messaging application provides access to both shared message threads shared with a private interaction hub and private message threads between a user of the mobile device and others who are not members of the hub. The messaging application also allows a user to send a message to all of the hub members without accessing a hub user interface of the hub application. The messaging application may not provide user access to other types of the hub data 610, other than the hub messages. For example, the messaging application may not provide access to the shared calendar events or shared photo albums of the hub.

The device applications 636 may also include a native or third-party calendaring application that provides scheduling alerts and access to a visual calendar. The calendaring application provides user access to both shared calendar events that are shared with hub members, and private calendar events (e.g., Exchange calendar events) that have not been shared with other members of the hub. The calendaring application also allows a user to create and/or share a calendar event to all members of the hub without accessing a hub user interface of the hub application. The application may not provide user access to other types of the hub data 610, other than the hub calendar events. For example, the calendaring application may not provide access to the shared message threads or shared photo albums of the hub.

The device applications 636 may also include a native or third-party media viewing and/or editing application that provides access to photo albums of digital photos or other digital media. The media application provides user access to both shared media files (e.g., photos, videos, and/or music) shared with a private interaction hub, and private media files that have not been shared with other members of the hub.

The media application also allows a user to share media files with all members of the hub without accessing a hub user interface of the hub application. The media application may not provide user access to other types of hub data 610, other than hub media files. For example, the media application may not provide access to the shared message threads or shared calendar events of the hub.

The hub operating system service 634 can expose one or more Application Programming Interfaces ("APIs"), application binary interfaces, and/or other types of interfaces 640 to the hub application 608 and to the device applications 636 on the mobile device 602 to allow these applications to access, generate, and/or modify the hub data 610 and/or the hub metadata 628, as described herein. The hub operating system service 634 can be implemented as an integrated software component or module of the operating system 632. The hub operating system service can be maintained at the mobile device 602 as executable instructions that are stored on computer-readable storage media, such as any suitable memory device or electronic data storage as described with reference to the example device shown in FIG. 10. Additionally, the hub operating system service can be executed with a processing system at the mobile device to implement aspects of private interaction hubs.

In embodiments, the hub operating system service 634 can initiate the hub management service 614 to provision a private interaction hub 618. A user of the mobile device 602 can start a private interaction hub 618 and also invite others to join an existing private interaction hub. For example, the hub user interface 606 of the hub application 608 may provide an existing hub member with the option to add a new member to the hub, and the user may identify the prospective member by providing either a mobile device number, or by selecting an existing contact from one of their social networks or other contacts.

The hub operating system service 634 can receive the request from an existing member user of the device and, in response, the hub operating system service 634 and/or the hub management service 614 communicates an invitation to join the hub as an SMS, MMS, or instant message sent to the prospective member's mobile device that may include a link to a registration site or other registration instructions. The hub operating system service 634 and/or the hub management service 614 receives (e.g., via a registration website) an acceptance to the invitation to join the private interaction hub that includes at least an account identifier (such as an SSO credential), and associates the new member with the existing hub at the hub management service 614. Updated membership information, including the new member's account identifier 620 may also be propagated to other mobile devices of other members in the private interaction hub from the hub management service 614. When the new member user joins the hub, he or she may be prompted to download and/or install various applications configured to provide access to the stored hub data 624 and the stored hub metadata 626, such as the hub application 608 and/or the any of the device applications 636. The hub application 608 may also be the entry point by which a user creates a new hub and/or modifies the membership of an existing hub.

A private interaction hub 618 can be provisioned for any association of people, such as family members, coworkers, friends, neighbors, and any other people that may be associated together in a hub. Additionally, a member user of one private interaction hub may also be a member of multiple hubs, which can be based on a single member sign-on that identifies the member to the hub operating system service 634 and/or to the hub management service 614. For example, a person may be a member of a family hub that associates members of the person's family, as well as a member of a neighborhood hub that associates members of the person's neighborhood, and a golf hub that associates the person's friends that often golf together.

The integration of the hub application 608 with the operating system 632 of the mobile device provides that a user of the device can view a message or update on the hub user interface 606 and in an application user interface of an application that is associated with the message or the update. For example, a hub calendar is integrated with the calendar application (e.g., a device application 636) on the mobile device 602, and a calendar update that is displayed in the hub user interface 606 can be selected by the user to initiate the update being displayed in a calendar user interface of the calendar application. Alternatively, the user may view the calendar user interface and select a calendar event that is associated with a private interaction hub to initiate a display of the hub calendar, which includes the calendar event for the members of the hub. As another example, a hub calendar event can be displayed in a hub user interface, and the device calendar application can access and display the hub calendar event along with any private data calendar events that only the user of the device has access to view in a user interface of the device calendar application. The hub application 608 and the device application 636 both acquire the same hub calendar event data (e.g., the same hub data 610 stored on the mobile device). The two different user interfaces (e.g., a hub user interface and a device application user interface) display the same calendar event data.

In another example, the hub messages and chat features are integrated with messaging applications (e.g., the device applications 636) on the mobile device 602, and an email, text, or instant message that is displayed in the hub user interface 606 can be selected by the user of the mobile device 602 to initiate the message being displayed in a messaging application user interface. Alternatively, the user may view a recent message from a member of a private interaction hub in a messaging application user interface, and select the message to initiate a display of the hub messages interface, such as to view the discussion thread associated with the recent message.

In embodiments, the hub operating system service 634 at the mobile device 602 can receive social network updates for the member users of a private interaction hub 618, such as when two or more of the members of the hub are also "friends" on a public social network site, such as (e.g., FACEBOOK®, TWITTER®, or LINKEDIN®). The social network updates can be pulled from a social network site based on the established association of the account identifiers 620 of the hub members of a private interaction hub 618 at the hub management service 614. The hub operating system service 634 can then aggregate the social network updates for a particular hub for display in the hub user interface 606 or on a homepage "live tile" associated with the hub. The hub operating system service 634 at the mobile device 602 can also be implemented to coordinate multi-user interactive updates to an event that is managed in a private interaction hub. For example, several members of a hub may participate in a multi-player interactive game, and each successive interactive update from a member of the hub is initiated by the member at a respective associated mobile device.

Figure 7:
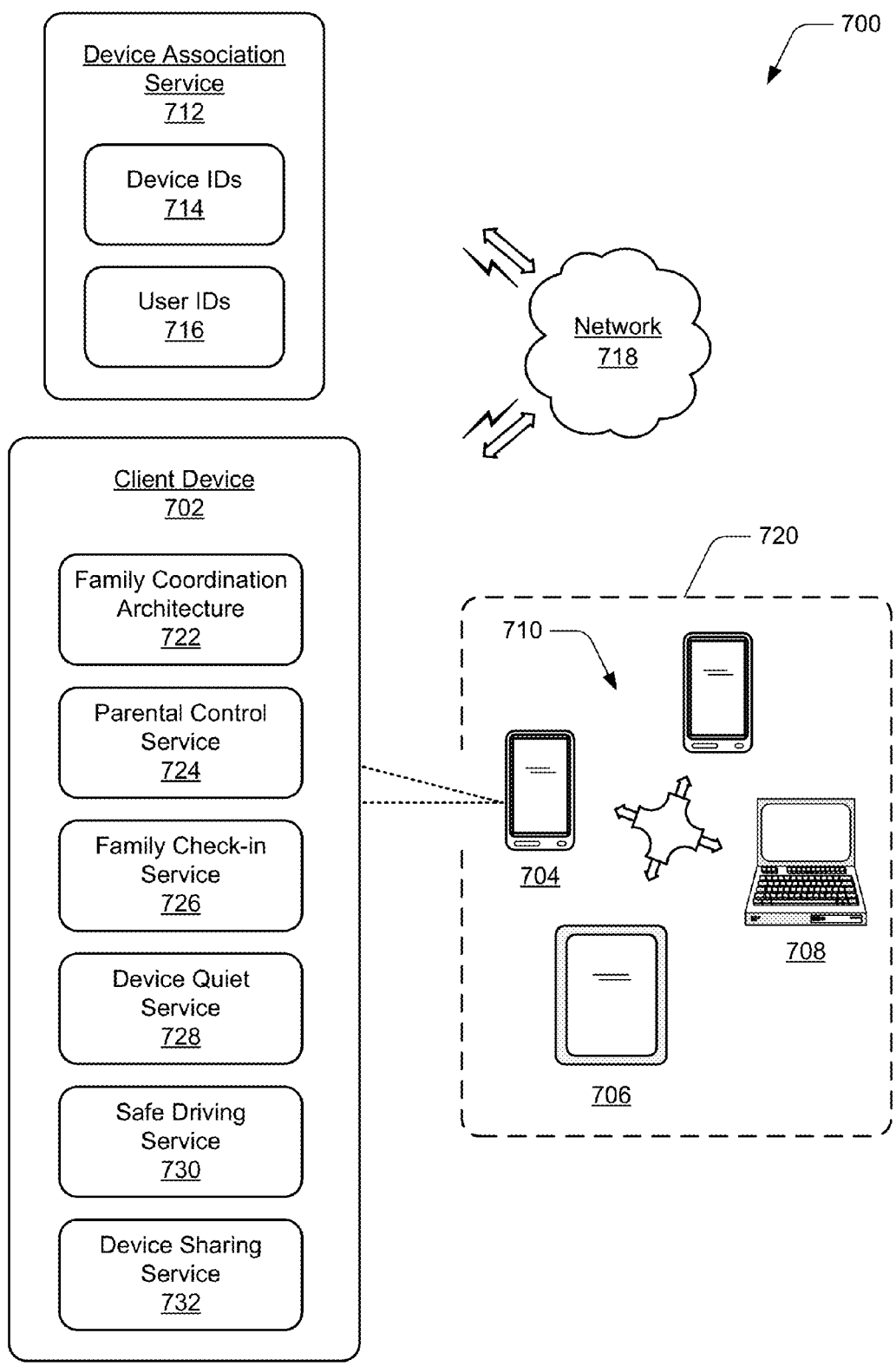
FIG. 7 illustrates an example system in which embodiments of restricted execution modes and/or family coordination can be implemented.

FIG. 7 illustrates an example system 700 in which various embodiments of private interaction hubs, restricted execution modes, and/or family coordination can be implemented. The example system includes a client device 702, which may be any one or combination of a mobile phone 704, tablet device 706, computing device 708, communication, entertainment, gaming, navigation, and/or other type of portable electronic device. Any of the client devices 710 can be implemented with various components, such as a processor and/or memory system, as well as any number and combination of differing components as further described with reference to the example device shown in FIG. 10.

The example system 700 includes a device association service 712 that associates or correlates the client devices 710 by device identifiers 714, user identifiers 716, and/or by any other type of identifiable association. Any of the devices and services can communicate via a network 718, which can be implemented to include wired and/or wireless networks. The network can also be implemented using any type of network topology and/or communication protocol, and can be represented or otherwise implemented as a combination of two or more networks, to include IP-based networks and/or the Internet. The network may also include mobile operator networks that are managed by mobile operators, such as a communication service provider, cell-phone provider, and/or Internet service provider. A mobile operator can facilitate mobile data and/or voice communication for any type of a wireless device or mobile phone.

The client devices 710 can each be associated with a different user, and the users are defined members of a family 720. The example client device 702 is representative of the various client devices 710 in the family. Any of the client devices in the family can include services, such as software applications (e.g., computer-executable instructions), that can be executed by a processor or processor system to implement the embodiments described herein. In this example, the client device 702 includes a family coordination architecture 722 that implements features of a family hub; a parental control service 724 that implements features of a parent dashboard; a family check-in service 726; a device quiet service 728 that implements features of quiet time and quiet zone; a safe driving service 730; and a device sharing service 732. The client device services are further described with reference to FIG. 8.

Additionally, any one or combination of the various client device services may be abstracted for implementation by a network service provider, such as the device association service 712. For example, the client devices 710 that are associated in the family 720 can be interconnected through a central computing device or system (e.g., may be one of the client devices 710), which may be local to the multiple devices or may be located remotely from the devices. In embodiments, the central computing device may be a cloud service of one or more server computers that are connected to the multiple devices via the network 718 or other communication link. The interconnection architecture enables functionality across multiple devices to provide a common and seamless experience to a user of the multiple devices. Each of the client devices may have different physical configurations and capabilities, and the central computing device implements a platform to enable delivery of an experience that is both tailored to a particular device and yet common to all of the devices.

Figure 8:
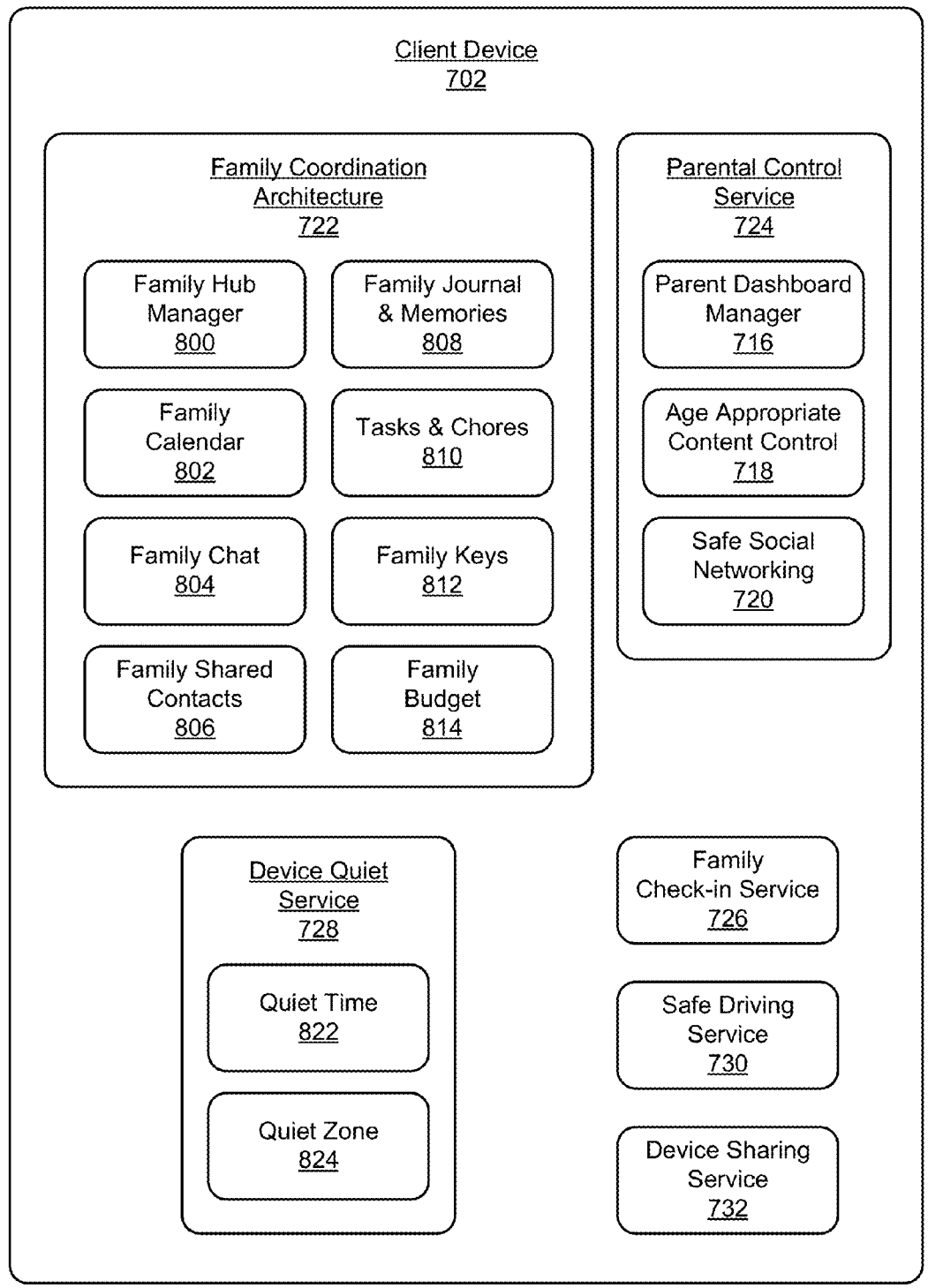
FIG. 8 illustrates various client device services and features in accordance with one or more embodiments.

FIG. 8 further illustrates the various client device services that are described with reference to FIG. 7. The client device 702 includes the family coordination architecture 722, the parental control service 724, the family check-in service 726, the device quiet service 728, the safe driving service 730, and the device sharing service 732, which may be embodied as the restricted execution service 202 described with reference to FIGS. 1-6. In embodiments, the family coordination architecture 722 may generally be implemented as a service, as described herein. Generally, any of the described services may be implemented and/or described in the general context of software, firmware, hardware (e.g., fixed logic circuitry), manual processing, applications, routines, programs, objects, components, data structures, procedures, modules, functions, or any combination thereof. A software implementation represents program code that performs specified tasks when executed by a computer processor. In embodiments, any of the processing, computation, filtering, code execution, etc. can be implemented with distributed computing services and/or devices, such as on a client device, a server device, and/or network-based service.

In this example of the client device services, the family coordination architecture 722 includes a family hub manager 800 that implements, coordinates, and/or manages various family features, such as family calendar 802, family chat 804, family shared contacts 806, family journal and memories 808, tasks and chores 810, family keys 812, and family budget 814. The parental control service 724 implements features such as a parent dashboard manager 816, age appropriate content control 818, and safe social networking 820. The device quiet service 728 implements features such as quiet time 822 and quiet zone 824. The various client device services and features are further described throughout the document.

Any of the client device services can include, be integrated with, or implement any of the other client device services and applications. For example, the family coordination architecture 722 can include any one or combination of the parental control service 724, the family check-in service 726, the device quiet service 728, the safe driving service 730, and the device sharing service 732. In embodiments, the family coordination architecture may be implemented for the coordination of time, messaging, data, activities, and any other shared services. The shared services may be any of the client device services and/or any type of shared services that may be associated with a service and/or multisystem operator (MSO) devices. Further, the parental control service can be implemented to throttle, expand, manage, and/or reallocate data sharing of the client device services.

Any of the family features and/or applications of the family coordination architecture can be implemented as private, some private and some public, or private with optional user control to share information and data with public third-party services and applications. Similarly, any of the client device services and applications described herein may be private, public, sharable, user-controllable, and/or any combination thereof. In embodiments, the family coordination architecture and/or the family hub manager can be implemented as an overall managing architecture, a collective embodiment of, and/or integration of any of the client device services and/or applications that may be implemented for expandability and instantiated together as the family coordination and/or the family hub architecture. Further, any of the client device services can include, be integrated with, or implement any of the other client device services and applications, and collectively may be embodied as a family hub and/or coordination architecture or service.

The device sharing service 732 can embody the restricted execution service 202 described with reference to FIGS. 1-6, such as to implement a phone share feature provides that a user can share his or her phone (e.g., a mobile device) with another person, yet limit the other person's access to features, functions, and information on the phone. For example, a user owner of a mobile phone can activate a restricted execution mode on the device and then share the phone with a stranger. In the restricted execution mode, only outgoing phone calls will be allowed and the restricted execution mode enforces the task restrictions to restrict an incoming call, yet allow the outgoing call when the origin of the outgoing call is traced to the device phone application that has been included in the shared space.

In an implementation, a parent can share his or her phone with a child to play a game on the phone, but the child cannot answer phone calls, read emails, access texting, access any other data and phone settings, or initiate any type of a monetary transaction (e.g., to buy a phone app or music download). Similarly, a phone user can share his or her photos on her phone with a friend that asks to look through the photos, but the friend cannot access any other phone data or settings. A phone user may also share his or her phone with anyone needing to make a phone call, but without giving access to any other phone data or settings.

Phone share as a feature of a restricted execution mode can be pass-coded to only allow another person access to designated functionality of the phone based on user set restrictions. A phone share pass-code can be quickly initiated with a gesture, key input, or sequence of key inputs. Additionally, phone share profiles can be implemented for different types of individuals, such as Friend, Parent, Stranger, Kid, Child, etc. The phone share features can also be implemented for a family phone in the house that any family member may take with them, such as when kids go out with friends, or a parent runs an errand to the store, or given to a house guest to use during their stay.

The device sharing service 732 is also implemented to restrict incoming phone calls and message displays to limit the communication functions of the mobile device 1000, yet can allow an outgoing phone call for shared use. The message displays may include email and text message displays, calendar events and alerts, instant messages, and any other messages that may be displayed for the user that owns the device (e.g., rather than the temporary, shared user). In a shared use mode of the mobile device, the device sharing service 732 can also restrict access to applications that allow a user to initiate a monetary transaction, such as via a browser, music, and/or gaming application via which a user can conduct a purchase transaction, download music, purchase and download an application, and any other type of monetary transaction. Although, there may be instances when a child may be allowed to access more money, such as to take a cab in an emergency. The device sharing service 732 can also be implemented to limit a younger child's ability to pair his or her phone with the car, or to send items to the printer in a home from a phone. As phones become NFC enabled and the phone can replace keys when providing secure access, device sharing service 732 can be implemented to limit the ability of a child to open some doors using a phone device.

Figure 9:
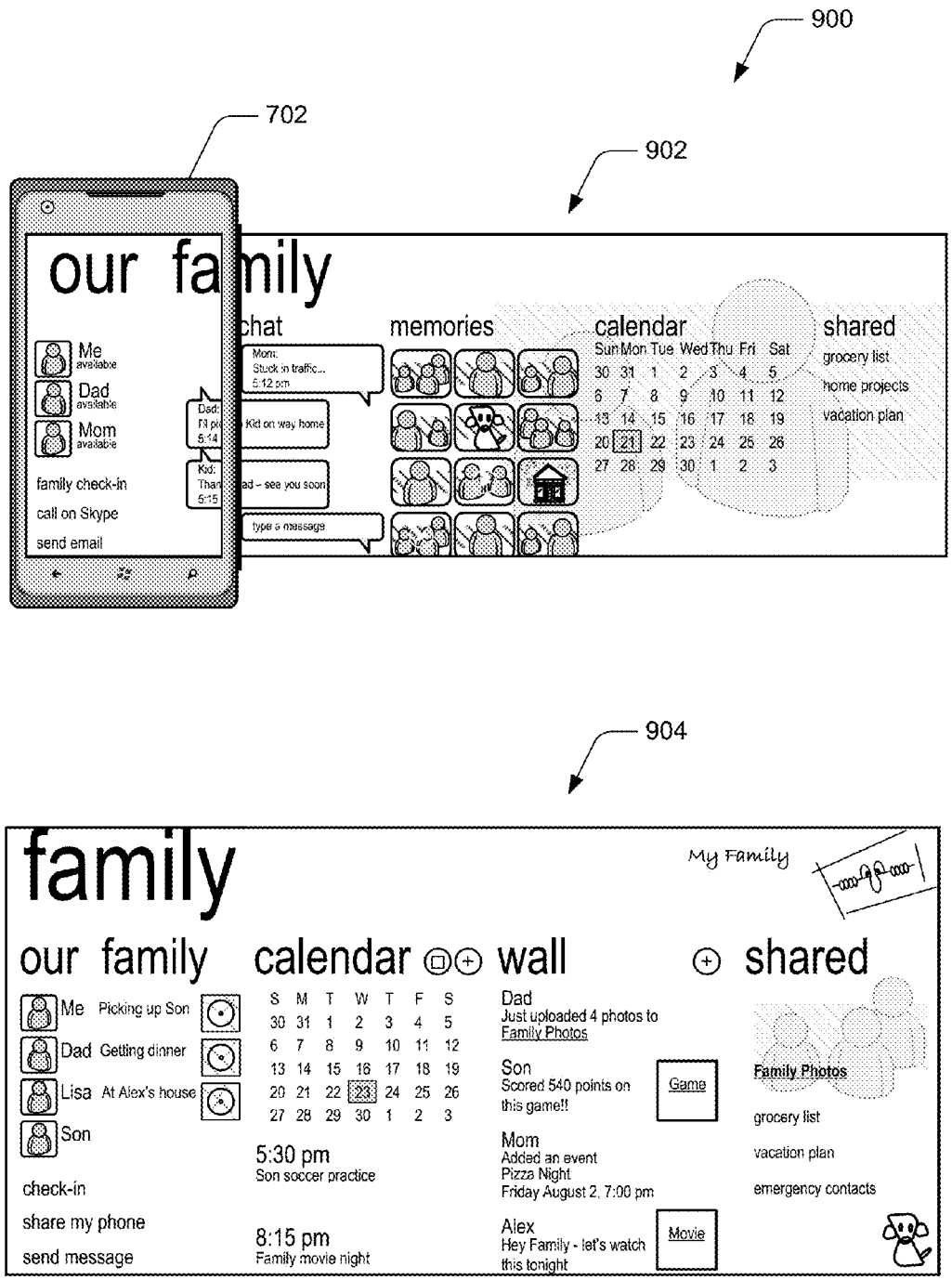
FIG. 9 illustrates examples of a family hub in accordance with one or more embodiments.

FIG. 9 is an example of a system 900 showing two different examples of hub user-interfaces 902, 904 for a family-orientated hub. The description, layout, orientation, features, and organization of the text, images, photos, graphics, links, data, information, and presentation features shown with reference to the hub user interfaces, as well as with reference to any other user interfaces described herein and/or shown in the figures, are merely examples that may be altered in any aspect for various embodiments and/or implementations of mobile device check-in.

The hub is a central space for membership-orientated coordination of communications, activities, information, and integration. Designated member relationships can be utilized to define how the data and information is managed, and can be implemented to leverage the social contract, such as between members of a defined familial group in the illustrated example. In one or more implementations, the hub is implemented as a user interface (e.g., via a client device application) for integration and aggregation of the membership-orientated communications, activities, and information. A hub can be implemented as a private, shared space between defined members. The hub contains links to other members' profiles, and based on restriction settings, allows aggregation for visibility of some of other members' data and information within the hub. The hub shares a group calendar which can be viewed and edited, a common text message window, a posting board, a shared photo album, a check-in feature, and any other type of shared information.

Devices and/or device accounts can be associated within a set of devices or device accounts (e.g., a family phone account, user accounts, a connected set of devices, and so on), and all or a subset of the devices or accounts can communicate with other devices or accounts. The members of a hub can be defined by any number of different classes of people, such as Junior, Teen, Mom, Dad, (or Parent), Grandparent, Nanny, Life-Coach, and so on for the illustrated example of a family. Further, the members of a family can be defined to distinguish a live-in Nanny from a Babysitter, for example.

Additionally, membership of the hub as well as use of the hub by the members can be controlled by a select collection of users, such as one or two mobile phones by the associated users of the client devices. For example, one of the members in the hub can be the designated control person, such as Mom who runs the household, employer, and so on.

From a single configuration of the members, the hub can be provisioned, setup, and propagated out, e.g., automatically. The features and configuration of a hub may default to an automatic, easy setup, but any rule, feature, or configuration aspect can be readily modified by a user. Provisioning a hub may be based on billing, e.g., a family or corporate billing plan. However, if a phone device is changed to a different carrier, for example, the phone device can still receive texts related to the hub. Alternatively or in addition, provisioning a hub can be based on email addresses, phone numbers, user account identifiers, or any other identifier.

A retail person selling a new phone package, for instance, can easily identify the members each to their new phone devices and initiate the hub being instantiated. From a consumer perspective, it just works and members can walk out of the store all set up. All of the data and information can be shared with a single selection, and thus the members do not have to share each item (e.g., a grocery list, photos, calendar, etc.) individually and separately.

The hub user interface may act as a shared space that is customizable and provides for user-generated and shared content. Some information can be shared, while other information is not. For example, Mom's complete Christmas list is not viewable by the other family members, but Dad and Kids can add to the list (and only view their contribution). Hub setup may be performed "a la carte," meaning only the features that members want displayed on the hub wall can be selected. For example, Mom wants to see the shopping list, whereas Dad does not shop and so wants to avoid having the list displayed on his device, yet he could still access the shopping list to add items when desired.

The hub user interface integrates functions, calendar functionality, event and/or data summaries (i.e., on the "wall"), as well as content that is shared between the members of the hub (e.g., lists, documents, etc.). For example, the hub user interface may include a "family check-in" or "check-in" option. The hub user interface may also include a chat section where location check-ins messaged are displayed along with other messages interchanged between the members of the hub. The hub "wall" is representative of an area via which members of the group may add to as desired, like a lunchroom bulletin board, family refrigerator, and so on. In implementations, the information can be aggregated in pillars or columns and shown on the hub wall as illustrated. The hub wall can also represent an interrelation between any of the information and data that appears on the wall and its placement in time. The hub settings provide that a user can control which functions are integrated and displayed within the hub, such as on the wall.

The hub information may also be context relevant to the members of the hub, and the calendar includes shared hub events. Calendar updates can be posted as notice events on the wall, and a user can look at the wall to see upcoming hub events, or the events that pertain to one or more other members of the hub. Messaging may also be performed that is private among the members of the hub. A member can instant text (or other communication) to all other members in the hub. Texting—such as for a work meeting—can divide each members' display on their respective devices into individual screens for each member.

The hub may also be extensible, and may link to a hard drive on a home computer, or sync to just one of the other devices, the manager, or cloud control (e.g., from a network-based service). The hub may also be extensible to third parties that add a note on the hub wall, such as implemented with application program interfaces (APIs) for functions to post data to the hub. A third-party application, however, would not have access to the context of the hub wall, such as to obtain or display hub data. The private information and hub data could be encrypted and only decrypted by the phone devices that are associated with the hub.

Thus, the hub supported by a hub coordination architecture may be thought of as a central space for coordination of communications, activities, information, and integration of members of the hub. Hubs may be defined to support a variety of different membership, such as for family members, coworkers, friends, acquaintances, fan clubs, and so forth. Therefore, although examples are discussed that relate to a family in the following discussion it should be readily apparent that membership in the hub may be defined in a variety of other ways without departing from the spirit and scope thereof. Accordingly, the hub coordination architecture may be used to support a variety of different functionality. An example of this functionality is described herein as a hub restricted execution service, and further aspects of private interaction hubs are also described herein.

Figure 10:
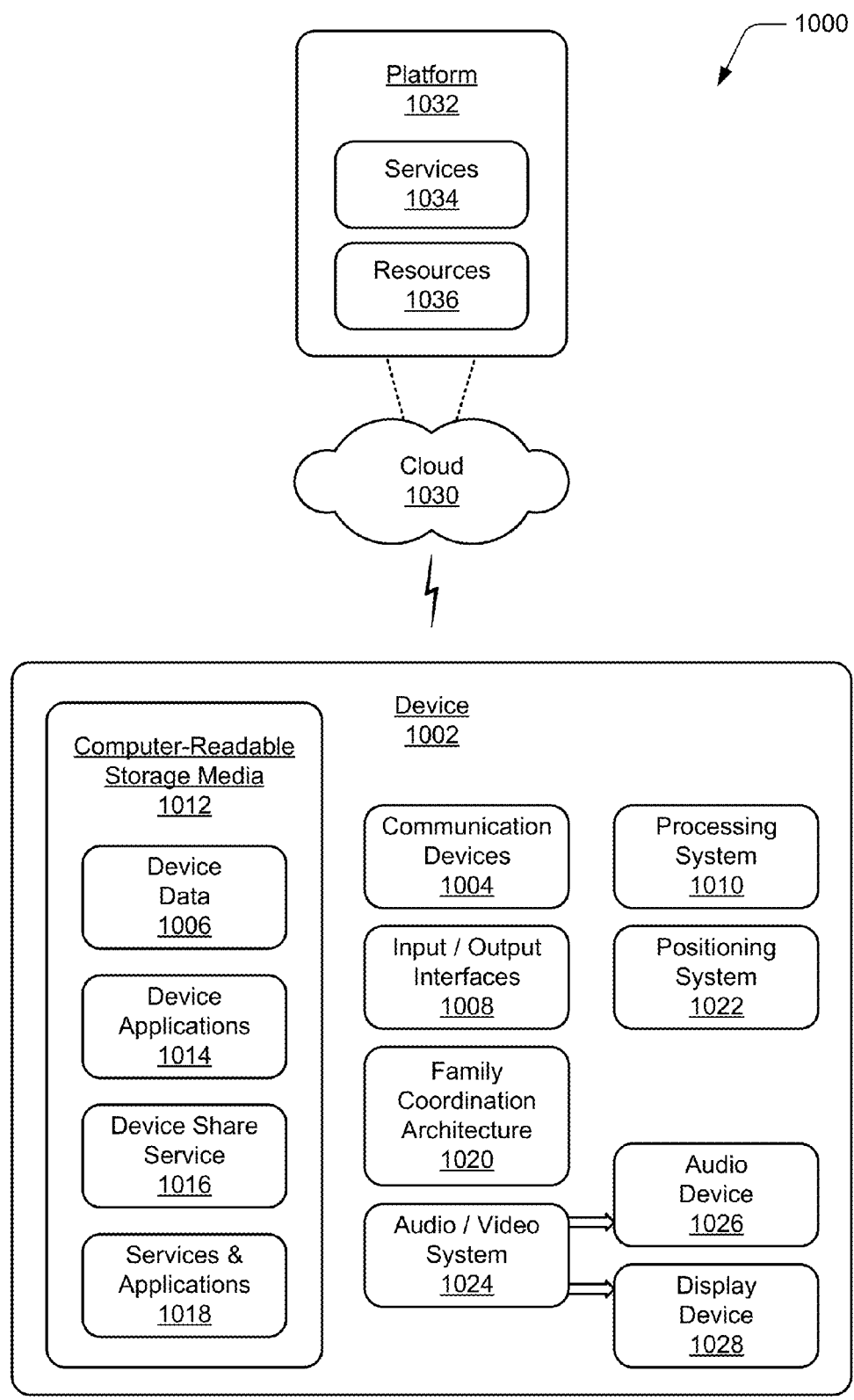
FIG. 10 illustrates an example system with an example device that can implement embodiments of restricted execution modes.

FIG. 10 illustrates an example system 1000 that includes an example device 1002, which can implement embodiments of restricted execution modes. The example device 1002 can be implemented as any of the devices, services, and/or servers described with reference to the previous FIGS. 1-9, such as any type of client or mobile device, mobile phone, tablet, computing, communication, entertainment, gaming, media playback, and/or other type of device. For example, the mobile device 100 shown in FIGS. 1-2 may be implemented as the example device 1002.

The device 1002 includes communication devices 1004 that enable wired and/or wireless communication of device data 1006, such as media content and the shared messages, updates, and events data at the device. The media content can include any type of audio, video, and/or image data. The communication devices 1004 can also include transceivers for cellular phone communication and/or for network data communication.

The device 1002 also includes input/output (I/O) interfaces 1008, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The I/O interfaces 1008 also support natural user interface (NUI) inputs to the device 1002, such as any interface technology that enables a user to interact with a device in a "natural" manner, free from artificial constraints imposed by input devices such as mice, keyboards, remote controls, and the like. Examples of natural user interface inputs may rely on speech recognition, touch and stylus recognition, gesture recognition on-screen and motion gesture recognition proximate the device, head, eye, and environment recognition and tracking, augmented reality and virtual reality systems, and any other type of audible, vision, touch, gesture, and/or machine intelligence that may determine user input intentions.

The device 1002 includes a processing system 1010 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1002 may further include any type of a system bus or other data and command transfer system that couples the various components within the device. A system bus can include any one or combination of different bus structures and architectures, as well as control and data lines.

The device 1002 also includes computer-readable storage media 1012, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

Generally, computer-readable storage media is representative of media and/or devices that enable persistent and/or non-transitory storage of data in contrast to mere signal transmission, carrier waves, or signals per se. A computer-readable signal media may refer to a signal-bearing medium that transmits instructions, such as via a network. The signal media can embody computer-readable instructions as data in a modulated data signal, such as carrier waves or other transport mechanism.

The computer-readable storage media 1012 provides storage of the device data 1006 and various device applications 1014, such as an operating system that is maintained as a software application with the computer-readable storage media and executed by the processing system 1010. In this example, the device applications also include a device share service 1016 that implements embodiments of restricted execution modes, such as when the example device 1002 is implemented as the mobile device 100 shown in FIG. 1. An example of the device share service 1016 is the restricted execution service 202 that is integrated with the operating system 204 at the mobile device 100, as described with reference to FIG. 1.

The device applications 1014 can also include any of the services and applications 1018 that implement embodiments of restricted execution modes. The example device 1002 also includes a family coordination architecture 1020, which may be implemented in the general context of software, firmware, hardware (e.g., fixed logic circuitry), or any combination thereof to support embodiments of restricted execution modes and/or mobile devices family coordination. The device 1002 can also include a positioning system 1022, such as a GPS transceiver, or similar positioning system components, that can be utilized to determine a global or navigational position of the device.

The device 1002 also includes an audio and/or video system 1024 that generates audio data for an audio device 1026 and/or generates display data for a display device 1028. The audio device and/or the display device include any devices that process, display, and/or otherwise render audio, video, display, and/or image data. In implementations, the audio device and/or the display device are integrated components of the example device 1002. Alternatively, the audio device and/or the display device are external, peripheral components to the example device.

In embodiments, at least part of the techniques described for restricted execution modes may be implemented in a distributed system, such as over a "cloud" 1030 in a platform 1032. The cloud 1030 includes and/or is representative of the platform 1032 for services 1034 and/or resources 1036. For example, the services 1034 may include the cloud storage and service 206, and any of the data services 208 as described with reference to FIG. 1. Additionally, the resources 1036 may include the accessible data 210 as described with reference to FIG. 1.

The platform 1032 abstracts underlying functionality of hardware, such as server devices (e.g., included in the services 1034) and/or software resources (e.g., included as the resources 1036), and connects the example device 1002 with other devices, servers, etc. The resources 1036 may also include applications and/or data that can be utilized while computer processing is executed on servers that are remote from the example device 1002. Additionally, the services 1034 and/or the resources 1036 may facilitate subscriber network services, such as over the Internet, a cellular network, or Wi-Fi network. The platform 1032 may also serve to abstract and scale resources to service a demand for the resources 1036 that are implemented via the platform, such as in an interconnected device embodiment with functionality distributed throughout the system 1000. For example, the functionality may be implemented in part at the example device 1002 as well as via the platform 1032 that abstracts the functionality of the cloud 1030.

Although embodiments of restricted execution modes have been described in language specific to features and/or methods, the appended claims are not necessarily limited to the specific features or methods described. Rather, the specific features and methods are disclosed as example implementations of restricted execution modes.

The invention claimed is:

1. A method comprising:
   causing display of a device lock screen on a display of a mobile device, the device lockscreen including an indicator that the mobile device is locked;
   receiving gesture input in any direction relative to the device lock screen;
   responsive to receiving the gesture input in any direction relative to the device lock screen, activating a restricted execution mode and transitioning from displaying the device lock screen to displaying an interface of the restricted execution mode without unlocking the mobile device, the restricted execution mode restricting access to device applications or device content of the mobile device by granting access to shared device applications or shared device content, the shared device applications or shared device content comprising a subset of multiple ones of the device applications or a plurality of device content of the mobile device;
   receiving an authentication credential; and
   deactivating the restricted execution mode, unlocking the mobile device, and transitioning to a normal user mode responsive to receiving the authentication credential.

2. The method of claim 1, wherein the authentication credential comprises a personal identification number (PIN) code.

3. The method of claim 1, wherein the authentication credential comprises a credential other than a personal identification number (PIN) code.

4. The method of claim 1, wherein the gesture input comprises a swipe gesture.

5. The method of claim 1, wherein the shared device applications or shared device content of the mobile device are selected for inclusion in the restricted execution mode by a user owner of the mobile device.

6. A mobile device, comprising:
   a display device configured to display a device lock screen and transition to a restricted execution mode responsive to receiving an input in any direction relative to the device lock screen, and deactivate the restricted execution mode and transition to a normal user mode in response to receiving an authentication credential; and
   a processing system configured to activate and deactivate the restricted execution mode of the mobile device, the restricted execution mode of the mobile device restricting access to functionalities of the mobile device by allowing access to multiple shared functionalities of the mobile device, the multiple shared functionalities comprising a subset of the functionalities of the mobile device.

7. The mobile device of claim 6, wherein the multiple shared functionalities of the mobile device are selected for inclusion in the restricted execution mode by a user owner of the mobile device.

8. The mobile device of claim 6, wherein the input comprises selection of a button displayed on the device lock screen.

9. The mobile device of claim 8, wherein the device lock screen includes an additional button, and wherein the display device is further configured to transition to an additional restricted execution mode responsive to receiving selection of the additional button.

10. The mobile device of claim 6, wherein the input comprises gesture input on the device lock screen.

11. The mobile device of claim 6, wherein the restricted execution mode restricts access to device content on the mobile device.

12. The mobile device of claim 6, wherein the device lock screen includes an indicator that the mobile device is locked.

13. The mobile device of claim 6, wherein the input comprises input other than an authentication credential.

14. The mobile device of claim 6, wherein the authentication credential comprises a personal identification number (PIN) code.

15. The mobile device of claim 6, wherein the authentication credential comprises a credential other than a personal identification number (PIN) code.

16. The mobile device of claim 6, wherein the input in any direction relative to the device lock screen comprises a swipe gesture in any direction on the device lock screen.

17. A method comprising:
  causing display of a device lock screen on a display of a mobile device, the device lock screen preventing access to full functionality of the mobile device;
  activating a restricted execution mode of the mobile device responsive to receiving input in any direction relative to the device lock screen, the restricted execution mode restricting access to applications installed on the mobile device by granting access to multiple shared applications, the multiple shared applications comprising a subset of the applications of the mobile device, the activating being performed without authenticating the input as being received from an owner of the mobile device; and
  deactivating the restricted execution mode and activating a normal user mode responsive to receiving a password or a personal identification number (PIN).

18. The method of claim 17, wherein the input comprises selection of a button displayed on the device lock screen.

19. The method of claim 17, wherein the input comprises gesture input on the device lock screen.

20. The method of claim 17, wherein the input comprises input other than the password or a pin.

* * * * *